(12) United States Patent
Park et al.

(10) Patent No.: US 12,228,837 B2
(45) Date of Patent: Feb. 18, 2025

(54) ELECTROPHORETIC PARTICLE AND LIGHT ROUTE CONTROL MEMBER HAVING THE SAME

(71) Applicant: LG INNOTEK CO., LTD., Seoul (KR)

(72) Inventors: Jin Gyeong Park, Seoul (KR); Byung Sook Kim, Seoul (KR); Moo Seong Kim, Seoul (KR); Jeung Ook Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 513 days.

(21) Appl. No.: 17/754,012

(22) PCT Filed: Sep. 14, 2020

(86) PCT No.: PCT/KR2020/012350
§ 371 (c)(1),
(2) Date: Mar. 21, 2022

(87) PCT Pub. No.: WO2021/054686
PCT Pub. Date: Mar. 25, 2021

(65) Prior Publication Data
US 2022/0373852 A1    Nov. 24, 2022

(30) Foreign Application Priority Data

Sep. 19, 2019 (KR) ............ 10-2019-0115633
Oct. 8, 2019 (KR) ............ 10-2019-0124600

(51) Int. Cl.
*G02F 1/167*    (2019.01)
*G02F 1/1676*   (2019.01)
*G02F 1/1675*   (2019.01)

(52) U.S. Cl.
CPC ............ *G02F 1/1676* (2019.01); *G02F 1/167* (2013.01); *G02F 2001/1678* (2013.01)

(58) Field of Classification Search
CPC .......... G02F 1/165; G02F 1/166; G02F 1/167; G02F 1/1675; G02F 1/1677
See application file for complete search history.

(56) References Cited

U.S. PATENT DOCUMENTS 6,929,889 B2  8/2005  Belmont
8,270,064 B2  9/2012  Feick et al.
(Continued)

FOREIGN PATENT DOCUMENTS

CN    102667601 A    9/2012
JP    2004-502856 A  1/2004
(Continued)

OTHER PUBLICATIONS

Office Action dated Mar. 8, 2024 in Korean Application No. 10-2019-0115633.
(Continued)

*Primary Examiner* — Joseph P Martinez
(74) *Attorney, Agent, or Firm* — Saliwanchik, Lloyd & Eisenschenk

(57) ABSTRACT

An electrophoretic particle according to an embodiment contains carbon black, and the electrophoretic particle comprises: a core portion; and a shell portion disposed to surround the outer surface of the core portion, wherein a protrusion portion is formed on the surface of the core portion, the core portion has a chromaticity index of 2 or less, the core portion has a light absorption rate of 90% to 99%, and the particle diameter of the electrophoretic particles is 50 nm to 800 nm.

18 Claims, 17 Drawing Sheets

(56) References Cited

U.S. PATENT DOCUMENTS

| | | |
|---|---|---|
| 9,632,386 B2 | 4/2017 | Takanashi et al. |
| 9,874,799 B2 | 1/2018 | Shiota |
| 10,962,835 B2 | 3/2021 | Min et al. |
| 2002/0011185 A1 | 1/2002 | Belmont |
| 2004/0135763 A1 | 7/2004 | Kaneko et al. |
| 2006/0203327 A1 | 9/2006 | Yasuda |
| 2010/0289736 A1 | 11/2010 | Feick et al. |
| 2017/0010516 A1 | 1/2017 | Shiota |
| 2019/0086733 A1 | 3/2019 | Min et al. |
| 2019/0278174 A1 | 9/2019 | Wang et al. |

FOREIGN PATENT DOCUMENTS

| | | | |
|---|---|---|---|
| JP | 2004-163703 A | 6/2004 | |
| JP | 2005-120223 A | 5/2005 | |
| JP | 2007-33630 A | 2/2007 | |
| JP | 2010-15102 A | 1/2010 | |
| KR | 10-2007-0088015 A | 8/2007 | |
| KR | 10-2007-0090662 A | 9/2007 | |
| KR | 10-2012-0001466 A | 1/2012 | |
| KR | 10-2013-0006536 A | 1/2013 | |
| KR | 10-2015-0075154 A | 7/2015 | |
| KR | 2015075154 * | 7/2015 | G02F 1/167 |
| KR | 10-2015-0125051 A | 11/2015 | |
| KR | 10-2016-0030592 A | 3/2016 | |
| KR | 10-2017-0126460 A | 11/2017 | |
| KR | 10-2018-0045778 A | 5/2018 | |
| KR | 10-2019-0032022 A | 3/2019 | |
| KR | 10-2019-0070843 A | 6/2019 | |
| WO | 2012/092906 A1 | 7/2012 | |
| WO | 2015/122083 A1 | 8/2015 | |

OTHER PUBLICATIONS

Office Action dated Oct. 31, 2023 in Japanese Application No. 2022-515943.

Supplementary European Search Report dated Sep. 22, 2023 in European Application No. 20865362.6.

International Search Report dated Dec. 8, 2020 in International Application No. PCT/KR2020/012350.

Office Action dated May 9, 2023 in Japanese Application No. 2022-515943.

* cited by examiner

LIGHT BLOCKING MODE

OPEN MODE

ELECTROPHORETIC PARTICLE AND LIGHT ROUTE CONTROL MEMBER HAVING THE SAME

CROSS-REFERENCE TO RELATED APPLICATIONS

This application is the U.S. national stage application of International Patent Application No. PCT/KR2020/012350, filed Sep. 14, 2020, which claims the benefit under 35 U.S.C. § 119 of Korean Application Nos. 10-2019-0115633, filed Sep. 19, 2019; and 10-2019-0124600, filed Oct. 8, 2019; the disclosures of each of which are incorporated herein by reference in their entirety.

TECHNICAL FIELD

An embodiment relates to electrophoretic particles having improved dispersibility and driving speed, and a light route control member including the same.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may be a light route control member that controls a movement path of light, block light in a specific direction, and transmit light in a specific direction. Accordingly, by controlling the light transmission angle by the light-shielding film, it is possible to control the viewing angle of the user.

Meanwhile, such a light-shielding film may be a light-shielding film that can always control the viewing angle regardless of the surrounding environment or the user's environment, and switchable light-shielding film that allows the user to turn on/off the viewing angle control according to the surrounding environment or the user's environment may be distinguished.

Meanwhile, there are various factors that control the characteristics of the switchable light blocking film having such an on-off function. For example, the light absorption rate and movement speed of the electrophoretic particles included in the light blocking pattern are also related to the characteristics of the light blocking film.

That is, the driving characteristics of the switchable light blocking film change according to the dispersibility of the electrophoretic particles and the movement speed of the electrophoretic particles, and the thickness of the switchable light blocking film can be controlled according to the light absorption rate of the electrophoretic particles.

Therefore, there is a need for electrophoretic particles having improved movement speed and light absorption, and a light route control member including the same.

DISCLOSURE

Technical Problem

An embodiment is directed is to provide an electrophoretic particle having an improved movement speed and a light absorption rate by increasing the surface roughness of the core in electrophoretic particles having a core and a shell structure, and a light route control member including the same.

Technical Solution

A light route control member according to an embodiment includes carbon black, and the electrophoretic particle includes a core portion; and a shell portion disposed to surround the outer surface of the core portion, and a protrusion is formed on the surface of the core part, and the core part has a chromaticity index of 2 or less, and the core part has a light absorptivity of 90% to 99%, and the electrophoretic particle has a particle diameter of 50 nm to 800 nm.

Advantageous Effects

An electrophoretic particle according to an embodiment, at least one of a groove and a protrusion is formed on the surface of the core constituting the electrophoretic particle. Thereby, the surface roughness of the core part may be increased. Therefore, it is possible to increase the specific surface area of the core part without reducing the particle size of the core part.

Therefore, it is possible to increase the coating area of the shell portion coated on the outer surface of the core portion, thereby improving the charging characteristics, thereby improving the movement speed of the electrophoretic particles.

In addition, since it is not necessary to reduce the size of the electrophoretic particles, it is possible to inhibit agglomeration of the electrophoretic particles having a small particle size distributed in a large number in the electrolyte.

In addition, by reducing the light reflectance of the electrophoretic particles, it is possible to reduce the height of the receiving unit.

Therefore, by improving the moving speed of the electrophoretic particles, it is possible to improve the driving characteristics of the switchable device to which the electrophoretic particles are applied. In addition, by reducing the height of the receiving unit, it is possible to reduce the thickness of the switchable device to which the electrophoretic particles are applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an electrophoretic particle and a light route control member including the same according to an embodiment will be described with reference to drawings. The light route control member described below relates to a switchable light route control member that drives in various modes according to the movement of electrophoretic particles application of a voltage.

First, an electrophoretic particle according to an embodiment will be described with reference to FIGS. 1 and 2.

Figure 1:
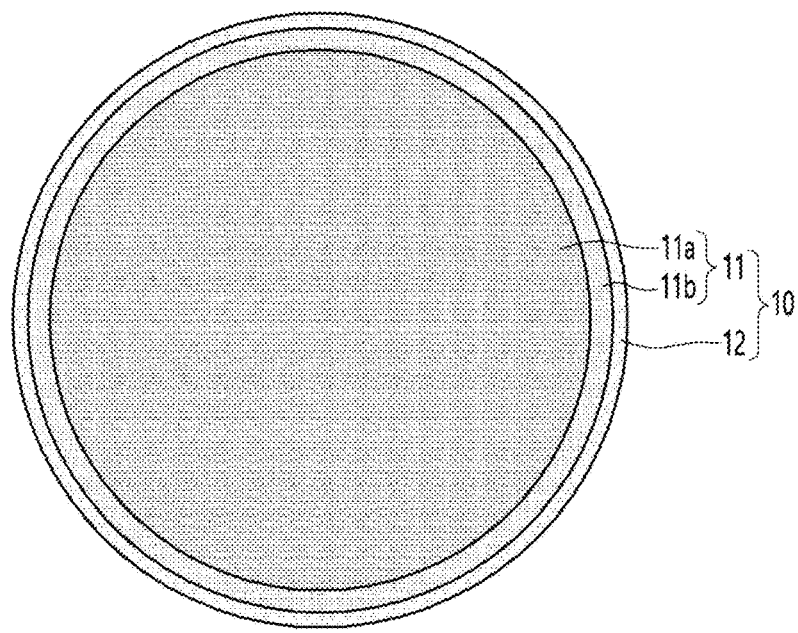
FIG. 1 is a cross-sectional view of an electrophoretic particle according to an embodiment.

Referring to FIGS. 1, the electrophoretic particles may have a multi-layered structure. In detail, the electrophoretic particles 10 may be formed in a core-shell structure. That is, the electrophoretic particles may include a core part 11 and a shell part 12 disposed to surround the core part 11.

The core part 11 may include a black material. In detail, the core part 11 may include a material that absorbs light. For example, the core part 11 may include at least one of carbon black, copper oxide, zinc oxide, aniline black, and activated carbon. In detail, the core part 11 may include carbon black.

Figure 2:
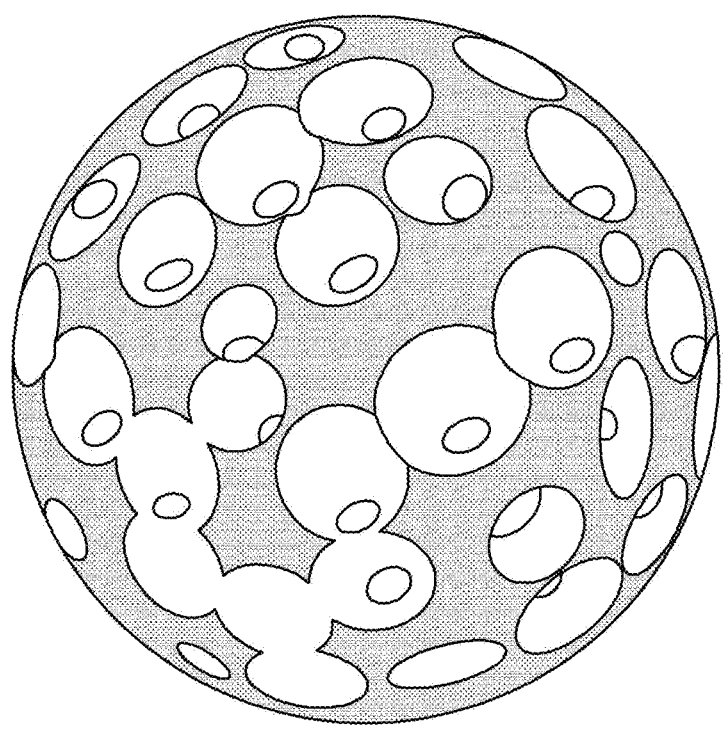
FIG. 2 is a perspective view of a core of the electrophoretic particle according to an embodiment.

Referring to FIG. 2, a pattern may be formed on the surface of the core part 11. In detail, a plurality of patterns for increasing the surface roughness of the core part 11 may be formed on the surface of the core part 11. These patterns may be defined as at least one pattern of grooves and protrusions formed on the surface of the core part 11. That is, the surface of the core part 11 may not be formed smoothly, but may be formed to have a constant roughness due to grooves and/or protrusions. That is, a plurality of grooves, a plurality of protrusions, or a plurality of grooves and a plurality of protrusions may be formed on the surface of the core part 11.

The grooves and/or protrusions formed on the surface of the core part 11 may be formed on the surface of the core part 11 at irregular intervals, non-uniform sizes and non-uniform shapes. That is, the surface of the core part 11 may be formed in an uneven shape or a concave-convex pattern shape by the grooves and/or protrusions.

The grooves and/or protrusions formed on the surface of the core part 11 may be formed by various methods. For example, a spherical surface shape may be formed on the surface of the core part 11 by a chemical etching method using an alkali solution or the like.

In addition, when manufacturing the core part 11, a plurality of nanoparticles, for example, a plurality of nano-sized carbon black particles is aggregated to form the core part 11. Thereby the surface shape of the core part 11 may be formed to have an overall uneven shape.

The grooves and/or protrusions formed on the surface of the core part 11 may increase the surface roughness of the core part 11. In addition, the specific surface area of the core part 11 may be increased by the grooves and/or protrusions formed on the surface of the core part 11. That is, the specific surface area of the core part 11 may be increased while maintaining the particle diameter of the core part 11. That is, compared to the core part having the same particle diameter, the core part 11 may have a larger specific surface area due to the pattern.

For example, the specific surface area of the core part 11 may be about 200 $m^2/g$ to 650 $m^2/g$. In detail, the particle diameter of the core part 11 is 50 nm to 800 nm, and in this case, the specific surface area of the core part 11 may be about 200 m²/g to 650 m²/g. Preferably, the particle diameter of the core part 11 may be 200 nm to 300 nm.

The increase in the specific surface area increases the coating area of the shell part, which will be described below, so that dispersibility and movement speed of the electrophoretic particles can be improved.

In addition, the core part 11 may increase the light absorptivity of the core part and decrease the light reflectance by the plurality of grooves and/or protrusions formed on the surface of the core part.

In detail, by the plurality of grooves and/or protrusions formed in the core part 11, it is possible to increase the absorption of light incident to the electrophoretic particles and decrease the light reflectance.

In addition, the core part 11 may improve the chromaticity index (L*) of the core part by grooves and/or protrusions formed on the surface of the core part.

Meanwhile, the surface of the core part 11 may be modified by a surface treatment process. In detail, the surface of the core part 11 is modified before the shell coating, so that it can be divided into a core 11a and a surface treatment layer 11b.

In detail, the shell part 12 described above is formed on the outer surface of the core part 11. That is, the outer surface of the core part 11 may be coated with a polymer material constituting the shell part 12. In detail, the shell part 12 may be formed through silane coating, and the surface of the core part 11 may be substituted with a hydroxyl group (—OH) or a carboxyl group (—COOH) that is easily reactive with the silane coupling agent.

Accordingly, the surface of the core part 11 is modified by being substituted with a hydroxyl group (—OH) or a carboxyl group (—COOH), and the shell part 12 may be formed on the surface of the core part 11 by silane coating.

The surface of the core part 11 may be modified by various methods. For example, by putting the core part 11 containing the carbon black in an acidic solution such as acetic acid, and the acidic solution and the surface of the core part react, the surface of the core part 11 may be substituted with a hydroxyl group (—OH).

Alternatively, the core part 11 whose surface is substituted with the hydroxyl group (—OH) is placed in an acidic solution having at least 6 carbon chains (for example oleic acid). By esterification of the core part and the oleic acid, the surface of the core part 11 may be substituted with a carboxyl group (—COOH).

The shell part 12 may be coated on the surface of the core part 11 to impart a surface charge to the electrophoretic particles.

In detail, when a silane coupling agent is coated on the surface of the core part whose surface is substituted with a hydroxyl group or a carboxyl group, the silane and the hydroxyl group or the silane and the carboxyl group react. Accordingly, the shell part 12 may be coated on the surface of the core part 11.

Thereby, the electrophoretic particles can have dispersibility in the dispersion, and can move in a specific polar direction in the dispersion when a voltage is applied by a surface charge.

The silane coating on which the shell part is formed may be related to a specific surface area of the core part 11. That is, as the specific surface area of the core part 11 increases, in proportion to this, the area on which the silane can be coated may increase.

Accordingly, the electrophoretic particles according to the embodiment increase the specific surface area of the core part 11. Accordingly, the coating area of the shell part 12 coated on the surface of the core part 11 may be increased. Accordingly, by increasing the area of the shell part 12 coated on the surface of the core part 11, dispersibility and surface charge characteristics by the shell part.

Hereinafter, the present invention will be described in more detail through electrophoretic particles according to Examples and Comparative Examples. These embodiments are merely presented as examples in order to explain the present invention in more detail. Therefore, the present invention is not limited to these examples.

EXAMPLE 1

The surface of the carbon black particles was etched using an alkali solution.

Figure 3:
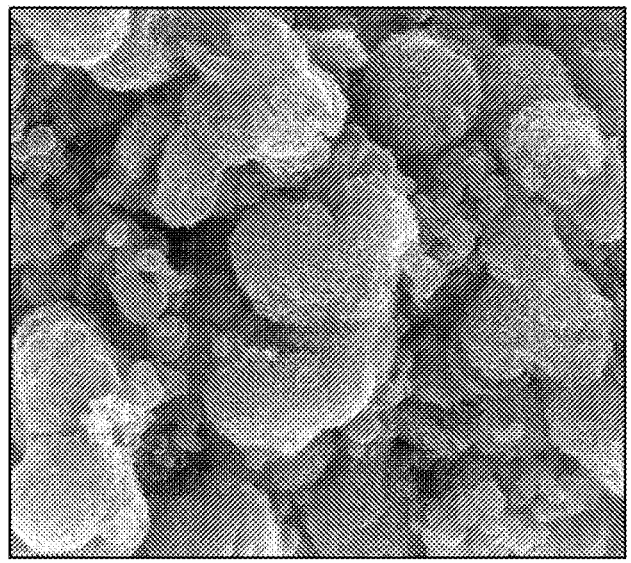
FIGS. 3 to 5 are views showing a scanning electron micrograph (SEM) of carbon black particles according to examples and comparative examples.

FIG. 3 is a view showing a scanning electron microscope photograph of carbon black particles whose surface has been etched by a chemical etching method.

Then, after measuring the specific surface area of the carbon black particles, the surface of the carbon black particles was modified. In detail, the carbon black particles were reacted with an acidic solution such as acetic acid to substituted the surface of the carbon black particles with a hydroxyl group (—OH).

Then, the carbon black particles were reacted with a silane coupling agent to form a charge coating layer on the surface of the carbon black particles to prepare electrophoretic particles.

Then, the light absorptance, light reflectance, chromaticity index (L*), and optical density of the electrophoretic particles were measured in the wavelength band of the visible light region.

EXAMPLE 2

A plurality of nano carbon black particles was aggregated to form carbon black.

Figure 4:
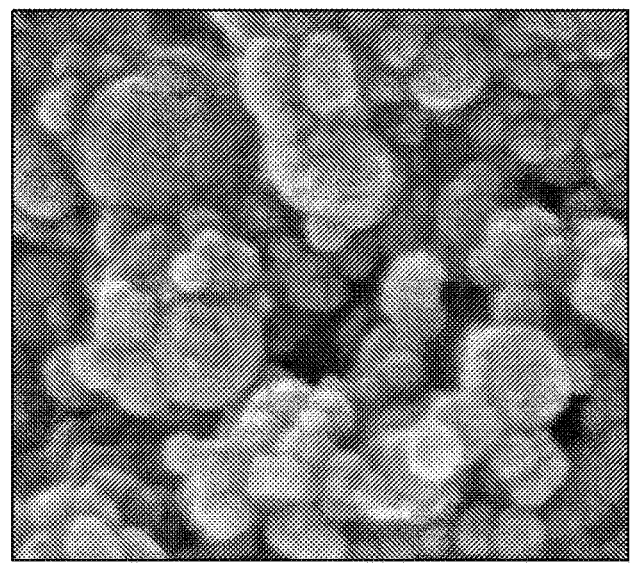

FIG. 4 is a view showing a scanning electron microscope photograph of carbon black particles formed by agglomeration of nano carbon black particles.

Then, after measuring the specific surface area of the carbon black particles, the surface of the carbon black particles was modified in the same manner as in Example 1, and then a charge coating layer was formed on the surface of the carbon black particles to prepare electrophoretic particles.

Then, the light absorptance, light reflectance, chromaticity index (L*), and optical density of the electrophoretic particles were measured in the wavelength band of the visible light region.

Comparative Example 1

Spherical carbon black particles having no pattern formed on the surface were prepared.

Figure 5:
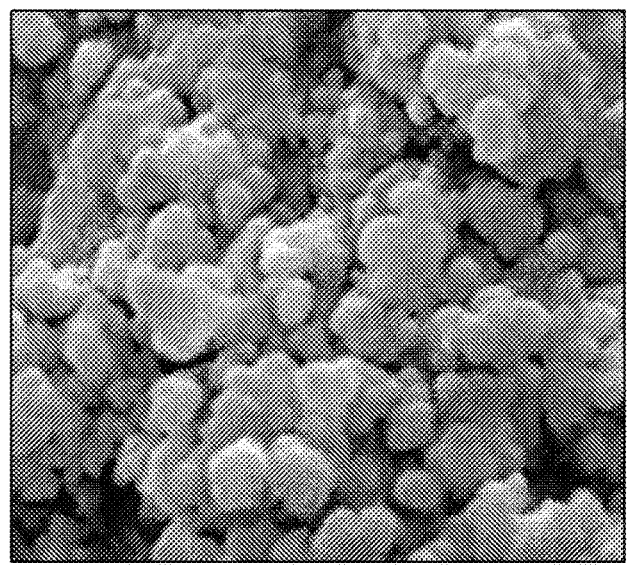

FIG. 5 is a view showing a scanning electron microscope photograph of spherical carbon black particles on which a surface pattern is not formed.

Then, after measuring the specific surface area of the carbon black particles, the surface of the carbon black particles was modified in the same manner as in Example 1, and then a charge coating layer was formed on the surface of the carbon black particles to prepare electrophoretic particles.

Then, the light absorptance, light reflectance, chromaticity index (L*), and optical density of the electrophoretic particles were measured in the wavelength band of the visible light region.

TABLE 1

| | light reflectance (%) | | |
| --- | --- | --- | --- |
| Wavelength (nm) | Comparative Example 1 | Example 1 | Example 2 |
| 400 | 85.1444 | 90.7189 | 93.5032 |
| 450 | 85.7984 | 91.3222 | 93.9255 |
| 500 | 86.0666 | 91.8091 | 94.2664 |
| 550 | 86.0224 | 92.0515 | 94.4361 |
| 600 | 85.8172 | 92.1161 | 94.4813 |
| 650 | 85.5165 | 92.0489 | 94.4342 |
| 700 | 85.2250 | 91.9083 | 94.3358 |

TABLE 2

| | light reflectance (%) | | |
| --- | --- | --- | --- |
| Wavelength (nm) | Comparative Example 1 | Example 1 | Example 2 |
| 400 | 14.8556 | 9.2810 | 6.4967 |
| 450 | 14.2016 | 8.6777 | 6.0744 |
| 500 | 13.9334 | 8.1908 | 5.7335 |
| 550 | 13.9776 | 7.9484 | 5.5639 |
| 600 | 14.1828 | 7.8838 | 5.5186 |
| 650 | 14.4835 | 7.9510 | 5.5657 |
| 700 | 14.7750 | 8.0916 | 5.6641 |

TABLE 3

| | chromaticity index (L*) | | |
| --- | --- | --- | --- |
| Wavelength (nm) | Comparative Example 1 | Example 1 | Example 2 |
| 550 | 12 | 1.60 | 0.92 |

TABLE 4

| | Comparative Example 1 | Example 1 | Example 2 |
| --- | --- | --- | --- |
| specific surface area (m$^2$/g) | 60 | 266 | 611 |

TABLE 5

| | optical density | | |
| --- | --- | --- | --- |
| Carbon content (wt %) | Comparative Example 1 | Example 1 | Example 2 |
| 400 | 0.2 | 0.23 | 0.26 |
| 450 | 0.25 | 0.3 | 0.34 |
| 500 | 0.32 | 0.36 | 0.43 |

Referring to Table 4, the specific surface area of the carbon black particles of the electrophoretic particles according to Examples 1 and 2 is greater than the specific surface area of the carbon black particles of the electrophoretic particles according to Comparative Example 1.

Accordingly, as described above, the specific surface area of the carbon black particles constituting the core is increased, and thus the coating area of the charge coating layer coated on the outer surface of the carbon black particles is increased.

Accordingly, the dispersibility of the electrophoretic particles according to the charge in the dispersion and the movement speed in the dispersion are improved.

In addition, referring to Tables 1 and 2, the electrophoretic particles according to Examples 1 and 2 have lower light reflectance and higher light absorption than the electrophoretic particles according to Comparative Example 1.

That is, the electrophoretic particles according to Examples 1 and 2 have a light absorptivity of 90% or more, that is, 90% to 99%, in a visible light wavelength region of 400 nm to 700 nm, and a light reflectance of 10% or less.

In addition, referring to Table 3, the electrophoretic particles according to Examples 1 and 2 have a smaller chromaticity index (L) value than the electrophoretic particles according to Comparative Examples. That is, the electrophoretic particles according to Examples 1 and 2 are closer to black than the electrophoretic particles according to Comparative Examples. That is, the electrophoretic particles according to the embodiment have a chromaticity index of 2 or less. In detail, the electrophoretic particles according to the embodiment have a chromaticity index of 2 or less. More specifically, the electrophoretic particles have a chromaticity index of 0 to 2.

In addition, referring to Table 5, the electrophoretic particles according to Examples 1 and 2 have a higher optical density than the electrophoretic particles according to Comparative Example 1.

Accordingly, since the light absorption rate is increased and the light reflectance is decreased, the same light blocking effect can be realized while reducing the amount of electrophoretic particles added to the dispersion.

Accordingly, it is possible to inhibit aggregation of the electrophoretic particles in the dispersion, thereby improving dispersibility, and increasing the movement speed, thereby improving the driving speed of a display device to which the electrophoretic particles are applied.

In addition, in the electrophoretic particles according to Examples 1 and 2, as optical density and chromaticity index are improved, only a smaller amount of electrophoretic particles is required. Accordingly, by reducing the thickness of the light conversion unit of the light route control member to which the electrophoretic particles are applied, it is possible to reduce the overall thickness of the light route control member.

Hereinafter, a switchable device including the electrophoretic particles described above will be described with reference to FIGS. 6 to 14.

Figure 6:
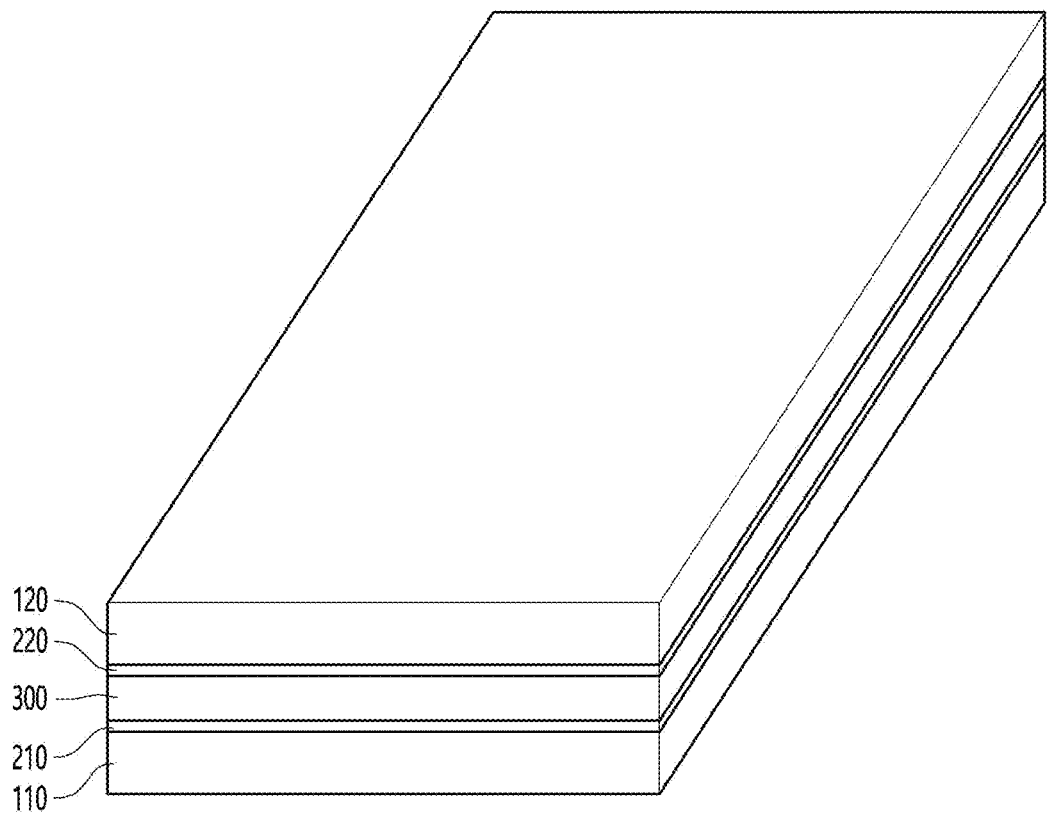
FIG. 6 is a perspective view of a light route control member to which electrophoretic particle is applied according to an embodiment.
Figure 7:
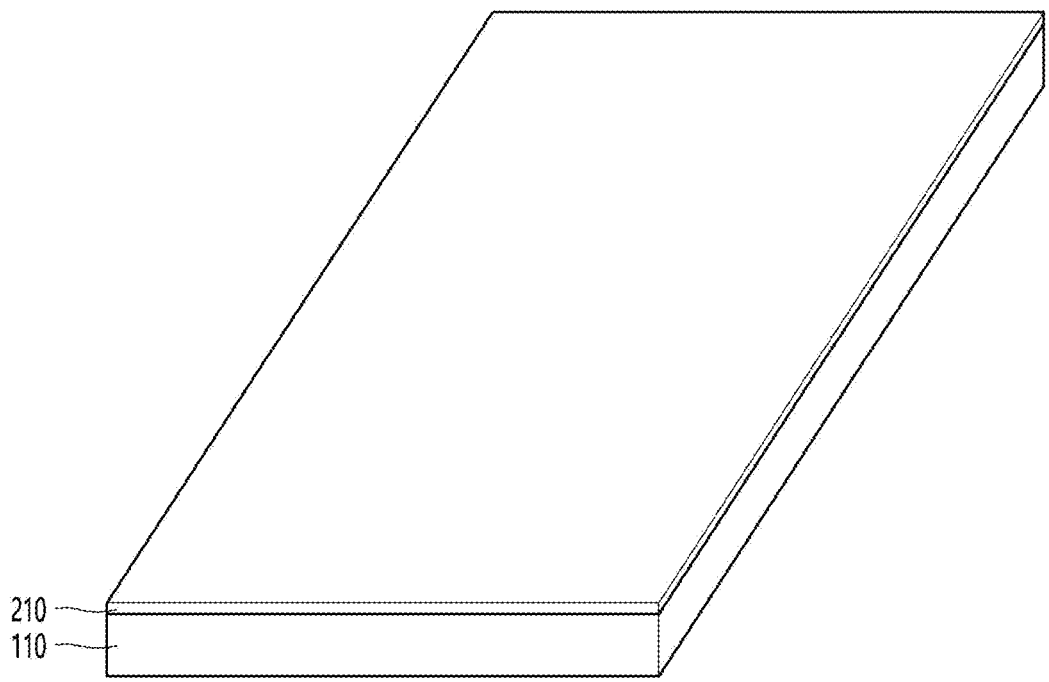
FIGS. 7 and 8 are views showing a perspective view of a first substrate and a first electrode and a perspective view of a second substrate and a second electrode of the light route control member according to the embodiment, respectively.
Figure 8:
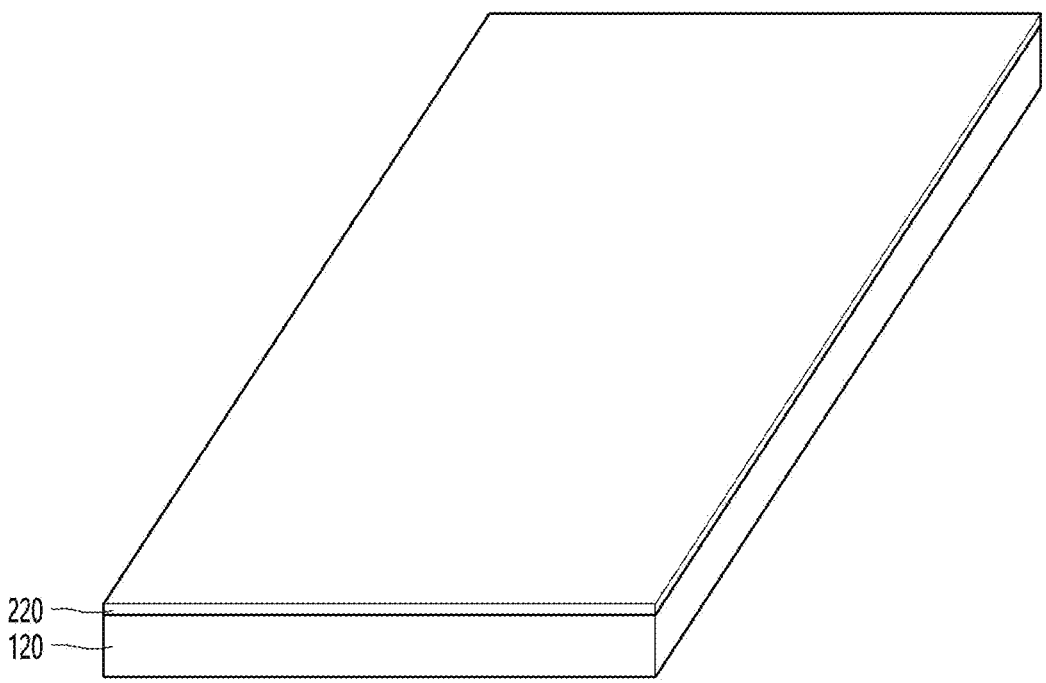

Referring to FIGS. 6 to 8, a light route control member according to an embodiment may include a first substrate 110, a second substrate 120, a first electrode 210, a second electrode 220, and a light conversion unit 300

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the light route control member including the first substrate 110 may also be formed to have flexible, curved, or bent characteristics. Accordingly, the light route control member according to the embodiment may be changed to various designs.

The first substrate 110 may have a thickness of about 1 mm or less.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may contain a transparent conductive material. For example, the first electrode 210 may contain a metal oxide such as indium tin oxide, indium zinc oxide, copper oxide, tin oxide, zinc oxide, titanium oxide, etc.

The first electrode 210 may be disposed on the first substrate 110 in a film shape. In detail, light transmittance of the first electrode 210 may be about 80% or more.

The first electrode 210 may have a thickness of about 10 nm to about 50 nm.

Alternatively, the first electrode 210 may contain various metals to realize low resistance. For example, the first electrode 210 may contain at least one metal of chromium (Cr), nickel (Ni), copper (Cu), aluminum (Al), silver (Ag), molybdenum (Mo). gold (Au), titanium (Ti), and alloys thereof.

In addition, the first electrode 210 may include a plurality of conductive patterns. For example, the first electrode 210 may include a plurality of mesh lines intersecting each other and a plurality of mesh openings formed by the mesh lines.

Accordingly, even though the first electrode 210 contains a metal, visibility may be improved because the first electrode is not visible from the outside. In addition, the light transmittance is increased by the openings, so that the brightness of the light route control member according to the embodiment may be improved.

The second substrate 120 may be disposed on the first substrate 110. In detail, the second substrate 120 may be disposed on the first electrode 210 on the first substrate 110.

The second substrate 120 may contain a material capable of transmitting light. The second substrate 120 may contain a transparent material. The second substrate 120 may contain a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the second substrate 120 may be a flexible substrate having flexible characteristics.

Further, the second substrate 120 may be a curved or bended substrate. That is, the light route control member including the second substrate 120 may also be formed to have flexible, curved, or bent characteristics. Accordingly, the light route control member according to the embodiment may be changed to various designs.

The second substrate 120 may have a thickness of about 1 mm or less.

The second electrode 220 may be disposed on one surface of the second substrate 120. In detail, the second electrode 220 may be disposed on a lower surface of the second substrate 120. That is, the second electrode 220 may be disposed on a surface on which the second substrate 120 faces the first substrate 110. That is, the second electrode 220 may be disposed facing the first electrode 210 on the first substrate 110. That is, the second electrode 220 may be disposed between the first electrode 210 and the second substrate 120.

The second electrode 220 may contain a transparent conductive material. For example, the second electrode 220 may contain a metal oxide such as indium tin oxide, indium zinc oxide, copper oxide, tin oxide, zinc oxide, titanium oxide, etc.

The second electrode 220 may be disposed on the first substrate 110 in a film shape. In addition, the light transmittance of the second electrode 220 may be about 80% or more.

The second electrode 220 may have a thickness of about 10 nm to about 50 nm.

Alternatively, the second electrode 220 may contain various metals to realize low resistance. For example, the second electrode 220 may contain at least one metal of chromium (Cr), nickel (Ni), copper (Cu), aluminum (Al), silver (Ag), molybdenum (Mo). gold (Au), titanium (Ti), and alloys thereof.

In addition, the second electrode 220 may include a plurality of conductive patterns. For example, the second electrode 220 may include a plurality of mesh lines intersecting each other and a plurality of mesh openings formed by the mesh lines.

Accordingly, even though the second electrode 220 contains a metal, visibility may be improved because the second electrode 220 is not visible from the outside. In addition, the light transmittance is increased by the openings, so that the brightness of the light route control member according to the embodiment may be improved.

The light conversion unit 300 may be disposed between the first substrate 110 and the second substrate 120. In detail, the light conversion unit 300 may be disposed between the first electrode 210 and the second electrode 220.

Referring to FIGS. 9 to 14, the light conversion unit 300 may include a partition wall unit 310 and a receiving unit 320.

The partition wall unit 310 may be defined as a partition wall region for partitioning a region of receiving unit 320. And the receiving unit 320 may be defined as a variable region that is variable to a light blocking unit and a light transmitting unit according to application of voltage.

The partition wall unit 310 and the receiving unit 320 may be alternately disposed. The partition wall unit 310 and the receiving unit 320 may be disposed in different widths. For example, the width of the receiving unit 320 may be greater than the width of the receiving unit 320.

The partition wall unit 310 and the receiving unit 320 may be alternately disposed. In detail, the partition wall unit 310 and the receiving unit 320 may be alternately disposed. That is, each of the partition wall units 310 may be disposed between the receiving units 320 adjacent to each other, and each of the receiving units 320 may be disposed between the partition wall units 310 adjacent to each other.

The partition wall unit 310 may contain a transparent material. The partition wall unit 310 may contain a material that may transmit light.

The partition wall unit 310 may contain a resin material. For example, the partition wall unit 310 may contain a photo-curable resin material. As an example, the partition wall unit 310 may contain a UV resin or a transparent photoresist resin. Alternatively, the partition wall unit 310 may contain urethane resin or acrylic resin.

The partition wall unit 310 may transmit light incident on any one of the first substrate 110 and the second substrate 120 toward another substrate.

For example, in FIGS. 9 to 14, light may be emitted in a direction of the first substrate 110 and the light may be incident in the direction of the second substrate 120. The partition wall unit 310 may transmit the light, and the transmitted light may be moved in a direction of the second substrate 120.

The receiving units 320 may include the dispersion 320a and the light conversion particles 10 described above. In detail, the receiving unit 320 is filled with the dispersion 320a, and a plurality of the light conversion particles 10 may be dispersed in the dispersion 320a.

The dispersion 320a may be a material for dispersing the light conversion particles 10. The dispersion 320a may contain a transparent material. The dispersion 320a may contain a non-polar solvent. In addition, the dispersion 320a may contain a material capable of transmitting light. For example, the dispersion 320a may include at least one of a halocarbon-based oil, a paraffin-based oil, and isopropyl alcohol.

The electrophoretic particles 10 may be disposed to be dispersed in the dispersion 320a. In detail, the plurality of electrophoretic particles 10 may be disposed to be spaced apart from each other in the dispersion 320a.

The electrophoretic particles 10 may have a particle diameter of about 50 nm to about 800 nm. Preferably, the electrophoretic particles 10 may be formed to have a particle diameter of about 200 nm to about 300 nm. When the particle diameter of the electrophoretic particles 10 is less than about 50 nm, the electrophoretic particles 10 may agglomerate to reduce dispersibility. And when the particle diameter of the electrophoretic particles 10 exceeds about 800 nm, the movement speed in the dispersion may be reduced due to an increase in the mass of the electrophoretic particles.

Meanwhile, as described above, the electrophoretic particles 10 increase the specific surface area of the core part, thereby increasing the coating area of the polymer charge coating layer coated on the core portion. Thereby, while maintaining the particle diameter of the electrophoretic particles 10, it is possible to improve the dispersibility and movement speed.

In detail, the driving speed of the light route member may be defined by Equation 1 below, and the moving speed of the electrophoretic particles in the dispersion may be defined by Equation 2 below.

$$t_{switch} = \frac{h^2}{\mu V} \quad \text{[Formula 1]}$$

h: distance between electrodes (height of partition wall unit)
μ: moving speed
V: diving vortage $$\mu = \frac{2\varepsilon\varepsilon_0 \zeta}{3\eta} \quad \text{[Formula 2]}$$

ε: permittivity
ζ: surface charge
η: viscosity

Referring to Equations 1 and 2, the driving speed of the light route control member is improved as the moving speed of the electrophoretic particles increases, and the moving speed of the electrophoretic particles is proportional to the amount of surface charge.

That is, the electrophoretic particles can increase the surface charge amount of the electrophoretic particles by increasing the coating area of the polymer charge coating layer related to the surface charge amount due to the increase in the specific surface area of the core.

Accordingly, the moving speed of the electrophoretic particles is increased, and the driving speed of the light route control member to which the electrophoretic particles are applied can also be shortened.

The light transmittance of the receiving unit 320 may be changed by the electrophoretic particles 10. In detail, the receiving unit 320 may be changed into the light blocking part and the light transmitting part by changing the light transmittance due to the movement of the electrophoretic particles 10.

For example, the light route control member according to the embodiment may be changed from a first mode to a second mode or from the second mode to the first mode by a voltage applied to the first electrode 210 and the second electrode 220.

In detail, in the light route control member according to the embodiment, the receiving unit 320 becomes the light blocking part in the first mode, and light of a specific angle may be blocked by the receiving unit 320. That is, a viewing angle of the user viewing from the outside may be narrowed.

In addition, in the light route control member according to the embodiment, the receiving unit 320 becomes the light transmitting part in the second mode, and in the light route control member according to the embodiment, light may be transmitted through both the partition wall unit 310 and the receiving unit 320. That is, the viewing angle of the user viewing from the outside may be widened.

Switching from the first mode to the second mode, that is, the conversion of the receiving unit 320 from the light blocking part to the light transmitting part may be realized by movement of the electrophoretic particles 10 of the receiving unit 320.

In detail, the receiving unit 320 may be electrically connected to the first electrode 210 and the second electrode 220.

In this case, when a voltage is not applied to the light route control member from the outside, the electrophoretic particles 10 of the receiving unit 320 are uniformly dispersed in the dispersion 320a, and light may be blocked by the electrophoretic particles in the receiving unit 320. Accordingly, in the first mode, the receiving unit 320 may be driven as the light blocking part.

Alternatively, when a voltage is applied to the light route control member from the outside, the electrophoretic particles 10 may move. For example, the electrophoretic particles 10 may move toward one end or the other end of the receiving unit 320 by a voltage transmitted through the first electrode 210 and the second electrode 220. That is, the electrophoretic particles 10 may move from the receiving unit 320 toward the first electrode or the second electrode.

In detail, when a voltage is applied to the first electrode 210 and/or the second electrode 220, an electric field is formed between the first electrode 210 and the second electrode 220, and the charged carbon black, that is, the electrophoretic particles may be moved toward a positive electrode of the first electrode 210 and the second electrode 220 using the dispersion 320a as a medium.

Figure 9:
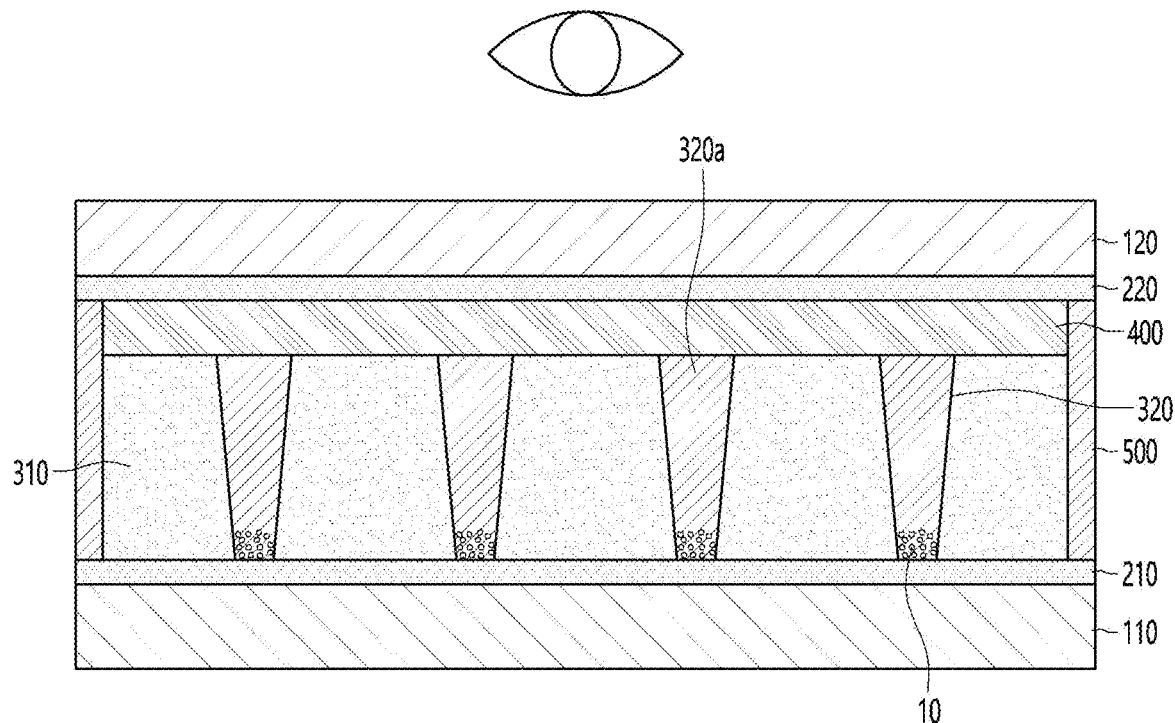
FIGS. 9 to 14 are views showing various cross-sectional views of the light route control member according to the embodiment.
Figure 10:
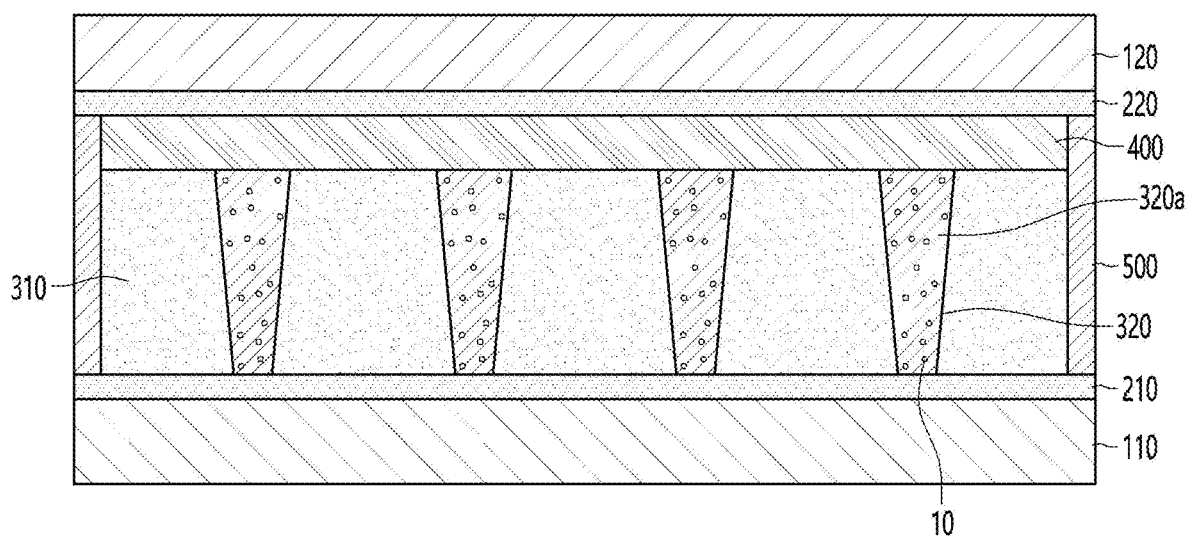
Figure 11:
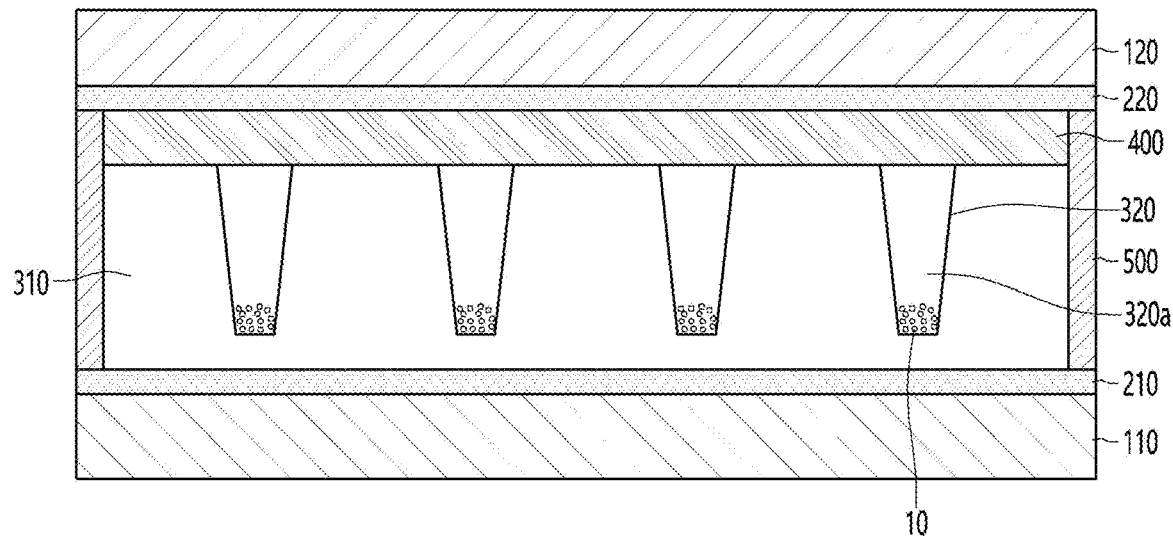
Figure 12:
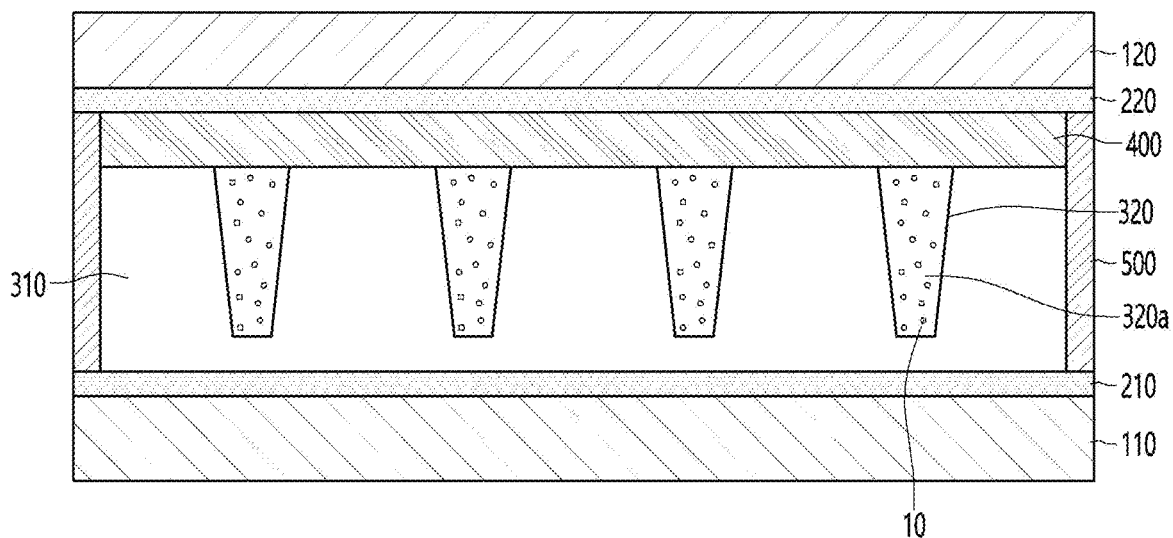
Figure 13:
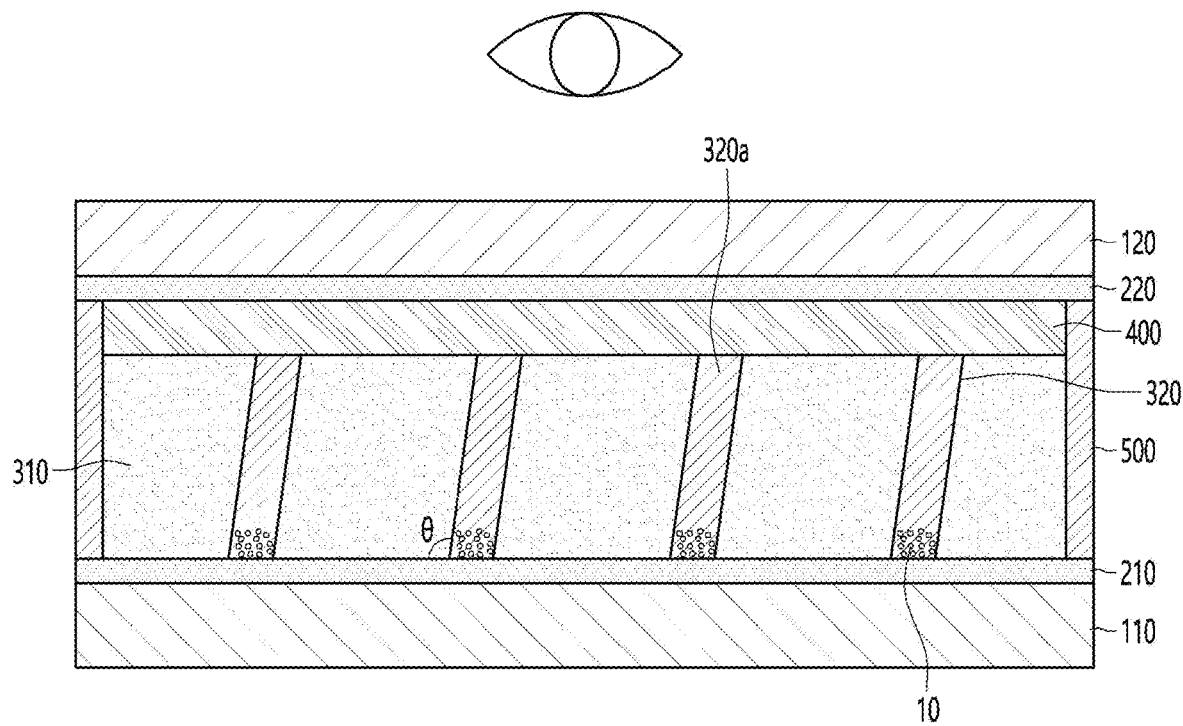
Figure 14:
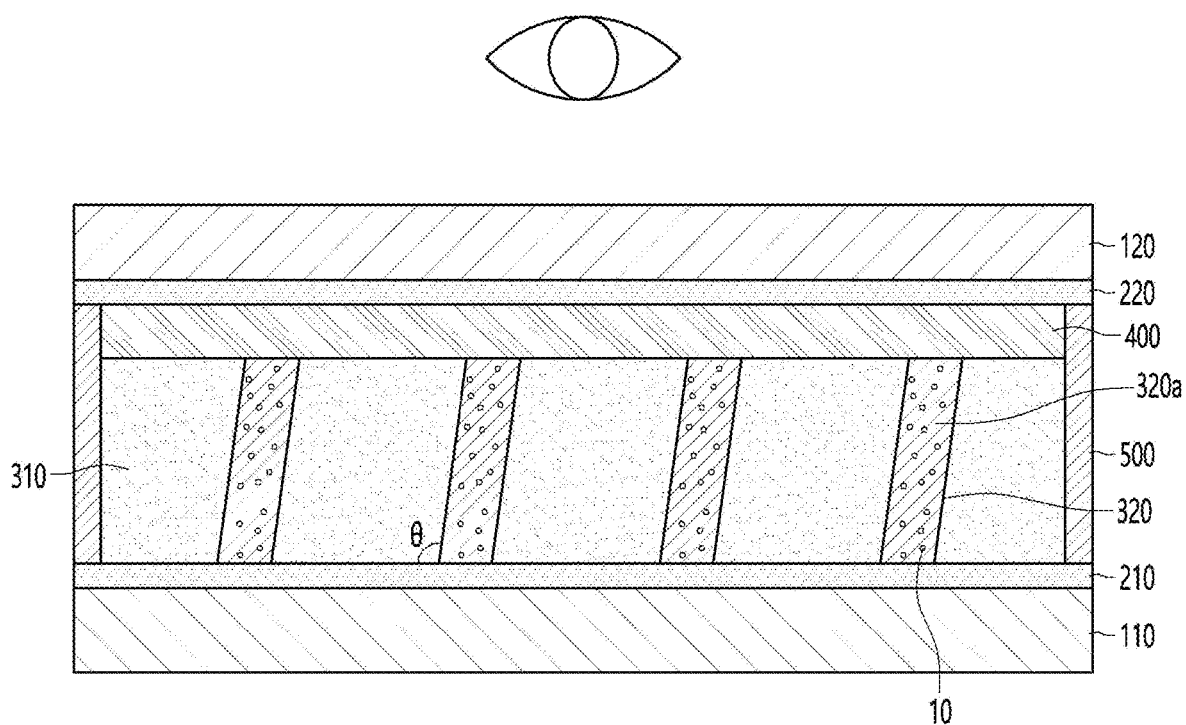

That is, when the voltage is not applied to the first electrode 210 and/or the second electrode 220, as shown in FIGS. 10, 12, 14, the electrophoretic particles 10 may be uniformly dispersed in the dispersion 320a to drive the receiving unit 320 as the light blocking part In addition, when the voltage is applied to the first electrode 210 and/or the second electrode 220, as shown in FIGS. 9, 11, 13, the electrophoretic particles 10 may be moved toward the first electrode 210 in the dispersion 320a. That is, the electrophoretic particles 10 are moved in one direction, and the receiving unit 320 may be driven as the light transmitting part Accordingly, the light route control member according to the embodiment may be driven in two modes according to a user's surrounding environment. That is, when the user requires light transmission only at a specific viewing angle, the receiving unit is driven as the light blocking part, or in an environment in which the user requires high brightness, a voltage may be applied to drive the receiving unit as the light transmitting part.

Therefore, since the light route control member according to the embodiment may be implemented in two modes according to the user's requirement, the light route control member may be applied regardless of the user's environment.

Meanwhile, the receiving unit 320 may be formed in various shapes.

In addition, referring to FIGS. 9 and 10, the receiving unit 320 extends from one end of the receiving unit 320 to the other end, and the width of the receiving unit 320 may be changed.

For example, referring to FIGS. 9 and 10, the receiving unit 320 may be formed in a trapezoidal shape. In detail, the receiving unit 320 may be formed so that the width of the receiving unit 320 is widened while extending from the first electrode 210 to the second electrode 220.

That is, the width of the receiving unit 320 may be narrowed while extending in the opposite direction from the user's viewing surface. Also, when a voltage is applied to the light transmitting part, the light-absorbing particles of the receiving unit 320 may move in a direction in which the width of the receiving unit is narrowed.

That is, the width of the receiving unit 320 may be increased while extending from the light incident part to which the light is incident to the light output part from which the light is emitted.

Accordingly, since the electrophoretic particles move in a direction opposite to the viewing surface rather than the viewing surface, blocking of light emitted in the viewing surface direction can be inhibited, thereby improving the luminance of the light route control member.

In addition, since the electrophoretic particles move from a wide region to a narrow region, the electrophoretic particles may be easily moved.

In addition, since the electrophoretic particles move to a narrow area of the receiving unit, the amount of light transmitted in the direction of the user's viewing surface is increased, thereby improving the front luminance.

Alternatively, on the contrary, the receiving unit 320 may be formed to extend from the first electrode 210 to the second electrode 220 and to have a narrow width of the receiving unit 320.

That is, the width of the receiving unit 320 may be widened while extending from the user's viewing surface to the opposite surface direction. In addition, when a voltage is applied to the light transmitting part, the electrophoretic particles of the receiving unit 320 may move in a direction in which the width of the receiving unit is widened.

That is, the width of the receiving unit 320 may be narrowed while extending from the light incident part to which the light is incident to the light output part from which the light is emitted.

Accordingly, the contact area between the first electrode and one surface of the receiving unit through which the electrophoretic particles move is increased, so that the moving speed of the light electrophoretic particles, that is, the driving speed may be increased.

Meanwhile, the receiving unit 320 may be disposed to be spaced apart from the first electrode 210 or the second electrode 220. That is, the receiving unit 320 may be disposed in contact with only one of the first electrode 210 and the second electrode 220.

For example, referring to FIGS. 11 and 12, the receiving unit 320 may be spaced apart from the first electrode 210.

The same or similar material to the partition wall 310 may be disposed in a region where the receiving unit 320 and the first electrode 210 are spaced apart from each other.

In addition, the receiving unit 320 may be disposed with an inclination angle θ. In detail, referring to FIGS. 13 and 14, the receiving part 320 may be disposed with an inclination angle θ of greater than 0° to less than 90° with respect to the first electrode 210 In detail, the receiving unit 320 may extend upwardly while having an inclination angle θ of greater than 0° to less than 90° with respect to one surface of the first electrode 210.

Accordingly, when the light route control member is used together with the display panel, moire caused by overlapping of the pattern of the display panel and the receiving unit 320 of the light path member may be inhibited, thereby improving user visibility.

In detail, the display panel may include pixel patterns extending in one direction. Accordingly, the pixel pattern and the pattern of the receiving unit 320 of the light route member may overlap to generate a moire phenomenon. However, by tilting the receiving unit pattern at a predetermined angle and disposing it, such a moire phenomenon may be inhibited.

That is, the receiving unit pattern and the pixel pattern may be disposed to cross each other, and in this case, the receiving unit pattern and the pixel pattern may be disposed to cross each other at an angle of greater than 0° to less than 90°.

Hereinafter, the present invention will be described in more detail through electrophoretic particles according to Examples and Comparative Examples. These embodiments are merely presented as examples in order to explain the present invention in more detail. Therefore, the present invention is not limited to these examples.

EXAMPLE 3

A first electrode was formed on the first substrate, and a second electrode was formed under the second substrate. Then, a plurality of receiving units partitioned by a partition wall unit between the first and second electrodes were formed to form an light route control member.

At this time, the receiving unit contained paraffinic oil and the electrophoretic particles of Example 1 dispersed in paraffinic oil.

Then, a DC 5V voltage was applied to the optical path control member, and it was observed whether the transmittance of the receiving unit was varied.

EXAMPLE 4

After forming the light route control member in the same manner as in Example 3 except that the electrophoretic particles of Example 2 were dispersed in the receiving part, it was observed whether the transmittance of the receiving part was changed.

Comparative Example 2

After the light route control member was formed in the same manner as in Example 3 except that the electrophoretic particles of Comparative Example 1 were dispersed in the receiving part, it was observed whether the transmittance of the receiving part was changed.

TABLE 6

|  | Example 3 | Example 4 | Comparative Example 2 |
|---|---|---|---|
| Driving time (s) | 11 | 3.5 | 14 |
| Transmittance variable rate (%) | 14.68 | 15.25 | 13.05 |
| Driving speed (%/s) | 1.33 | 4.36 | 0.93 |

Referring to Table 6, the light route control member of Examples 3 and 4 has a higher driving speed and improved transmittance variable rate, compared to the light route control member of Comparative Example 2.

That is, since the light route control member of Examples 3 and 4 includes the electrophoretic particles having improved specific surface areas, the transmittance variability increases due to the improvement of the absorptivity of the electrophoretic particles and the reduction of the reflectance.

In addition, since the light path controlling member of Examples 3 and 4 includes the electrophoretic particles having improved specific surface area, the moving speed of the electrophoretic particles can be improved, thereby improving the driving speed of the light route control member.

Hereinafter, a light route control member according to another embodiment will be described with reference to FIGS. 15 to 28. In the description of the light route control member according to another embodiment, descriptions of the same contents as those of the above-described embodiment will be omitted, and the same reference numerals will be given to the same components. In addition, the light route control member according to another embodiment may be combined with the light route control member according to the above-described embodiment.

In the light route control member according to another embodiment, a plurality of patterns may be formed on a substrate.

Figure 15:
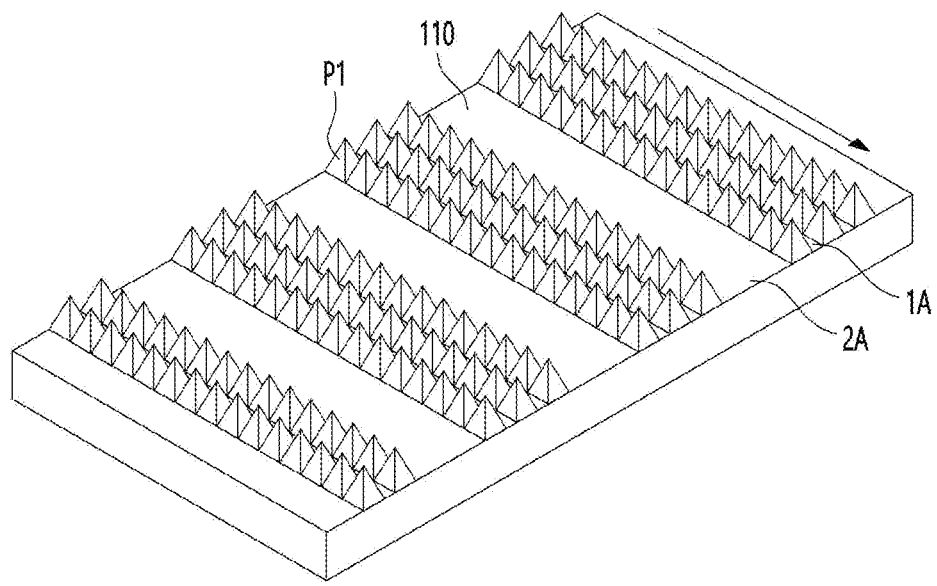
FIG. 15 is a perspective view of the first substrate the light route control member according to another embodiment.

Referring to FIG. 15, a plurality of patterns may be formed on the first substrate 110. In detail, a plurality of first protruding patterns P1 may be formed on any one surface of the first substrate 110.

The first protruding patterns P1 may include the same material as the first substrate 110. The first protrusion pattern P1 may be integrally formed with the first substrate 110.

The first protruding patterns P1 may be disposed to extend in one direction on the first substrate 110. Referring to FIG. 2, the first protruding patterns P1 may be arranged to extend in the direction of the short width of the first substrate 110 in the direction of the arrow.

A first area 1A in which the first protrusion pattern P1 is disposed and a second area 2A in which the first protrusion pattern P1 is not disposed may be included on the first substrate 110. In detail, the first protrusion pattern P1 may be disposed only in an area overlapping the receiving unit of the light conversion part 300 to be described below. That is, the first area 1A may overlap the area where the receiving unit is disposed, and the second area may overlap the area where the partition wall part of the light conversion part 300 is disposed.

Figure 16:
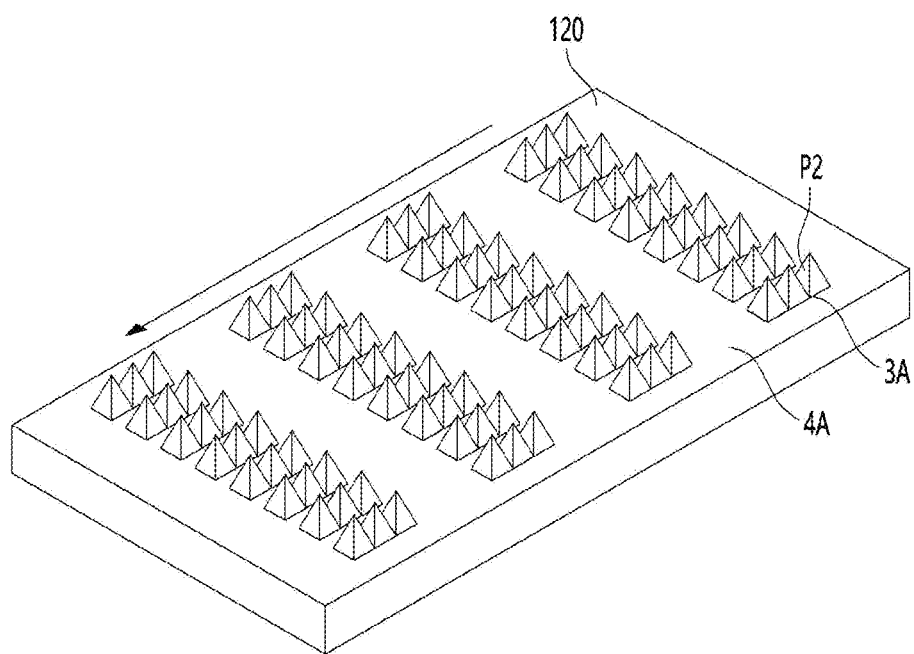

In addition, referring to FIG. 16, a plurality of patterns may be formed on the second substrate 120. In detail, a plurality of second protrusion patterns P2 may be formed on any one surface of the second substrate 120.

The second protrusion patterns P2 may include the same material as the second substrate 120. The second protrusion pattern P2 may be integrally formed with the second substrate 120.

The second protruding patterns P2 may be disposed to extend in one direction on the second substrate 120. Referring to FIG. 3, the second protruding patterns P2 may be arranged to extend in the direction of the arrow and in the long width direction of the second substrate 120. That is, the first protrusion pattern P1 and the second protrusion pattern P2 may be disposed to extend in different directions.

A third area 3A in which the second protrusion pattern P2 is disposed and a fourth area 4A in which the second protrusion pattern P2 is not disposed may be included on the second substrate 120. In detail, the second protrusion pattern P2 may be disposed only in an area overlapping the receiving unit of the light conversion part 300 to be described below. That is, the third area 3A may overlap the area where the receiving unit is disposed, and the fourth area may overlap the area where the partition wall part of the light conversion part 300 is disposed.

That is, the first region 1A of the first substrate 110 and the third region 3A of the second substrate 120 overlap each other, and the second region of the first substrate 110. (2A) and the fourth region 4A of the second substrate 120 may overlap each other.

Figure 17:
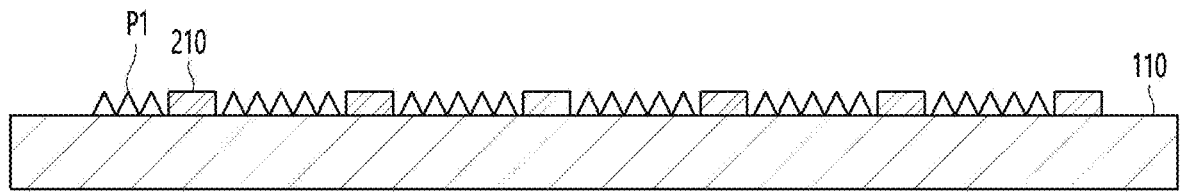
FIG. 17 is view showing a cross-sectional view taken along line A-A' of FIG. 15, showing a cross-sectional view in which, a first electrode is disposed on a first substrate.

Referring to FIG. 17, the first electrode 210 may be disposed on the same surface as the first protruding pattern P1. That is, the first electrode 210 and the first protrusion pattern P1 may be disposed on the same surface of the first substrate 110.

In detail, the first protrusion pattern P1 may be disposed on a first region of the first substrate 110, and the first electrode 210 may be disposed on a second region of the first substrate 110. That is, the first electrode 210 may be disposed on a region overlapping the receiving unit of the light conversion part 300. That is, the first electrode 210 may be disposed as a plurality of pattern electrodes on one surface of the first substrate.

Figure 18:
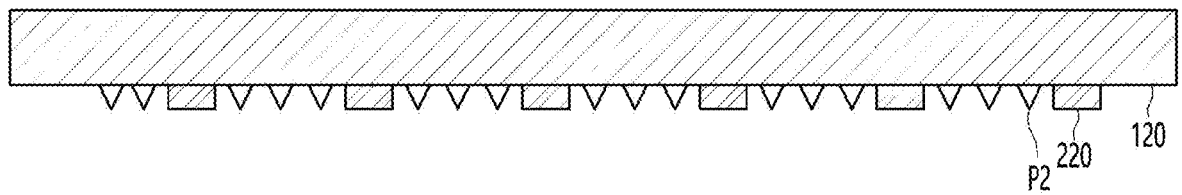
FIG. 18 is view showing a cross-sectional view taken along line B-B' of FIG. 16, showing a cross-sectional view in which, a second electrode is disposed on a second substrate.

In addition, referring to FIG. 18, the second electrode 220 may be disposed on the same surface as the second protrusion pattern P2. That is, the second electrode 220 and the second protrusion pattern P2 may be disposed on the same surface of the second substrate 120.

In detail, the second protrusion pattern P2 may be disposed on a third region of the second substrate 120, and the second electrode 220 may be disposed on a fourth region of the second substrate 120. That is, the second electrode 220 may be disposed on an area overlapping the receiving unit of the light conversion part 300. That is, the second electrode 220 may be disposed as a plurality of pattern electrodes on one surface of the second substrate.

Figure 19:
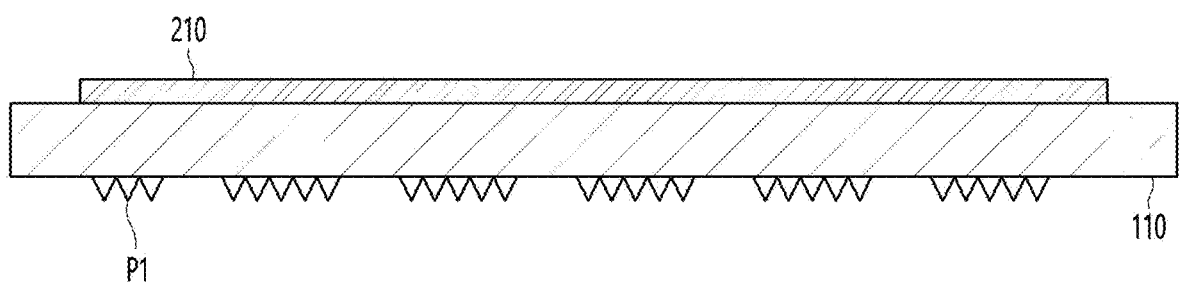
FIG. 19 is view showing a cross-sectional view taken along line A-A' of FIG. 15, showing another cross-sectional view in which, a first electrode is disposed on a first substrate.

Alternatively, referring to FIG. 19, a first electrode 210 may be disposed on one surface of the first substrate 110.

The first electrode 210 may be disposed on a different surface from the first protruding pattern P1. That is, the first electrode 210 and the first protrusion pattern P1 may be respectively disposed on opposite surfaces of the first substrate 110.

In detail, the first protrusion pattern P1 is disposed on one surface of the first substrate 110, and the first electrode 210 is disposed on the other surface opposite to one surface of the first substrate 110.

In addition, the first electrode 210 may be disposed as a surface electrode on the other surface of the first substrate 110. That is, the first electrode 210 may be disposed on the first and second regions of the first substrate 110 on the other surface of the first substrate 110.

Accordingly, the process of separately patterning the first electrode 210 may be omitted.

Figure 20:
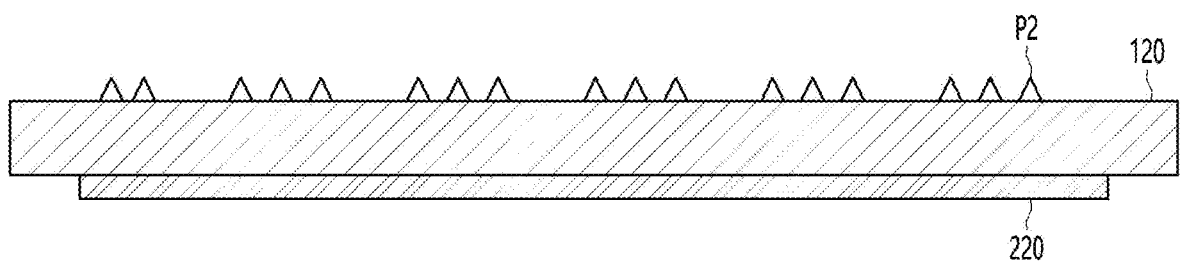
FIG. 20 is view showing a cross-sectional view taken along line B-B' of FIG. 16, showing another cross-sectional view in which, a second electrode is disposed on a second substrate

Also, referring to FIG. 20, a second electrode 220 may be disposed on one surface of the second substrate 120.

The second electrode 220 may be disposed on a surface different from that of the second protrusion pattern P2. That is, the second electrode 220 and the second protrusion pattern P2 may be respectively disposed on opposite surfaces of the second substrate 120.

In detail, the second protrusion pattern P2 is disposed on one surface of the second substrate 120, and the second electrode 220 is disposed on the other surface opposite to one surface of the second substrate 120.

In addition, the second electrode 220 may be disposed as a surface electrode on the other surface of the second substrate 120. That is, the second electrode 220 may be disposed on the third and fourth regions of the second substrate 120 on the other surface of the second substrate 120.

Accordingly, the process of separately patterning the second electrode 220 may be omitted.

The first substrate 110 and the second substrate 120 may include the first protrusion patterns P1 and the second protrusion pattern P2 described above, respectively.

Referring to FIGS. 21 to 28, the patterns may be disposed at various positions depending on the relationship between the first substrate 110, the second substrate 120, and the light conversion unit 300.

Figure 21:
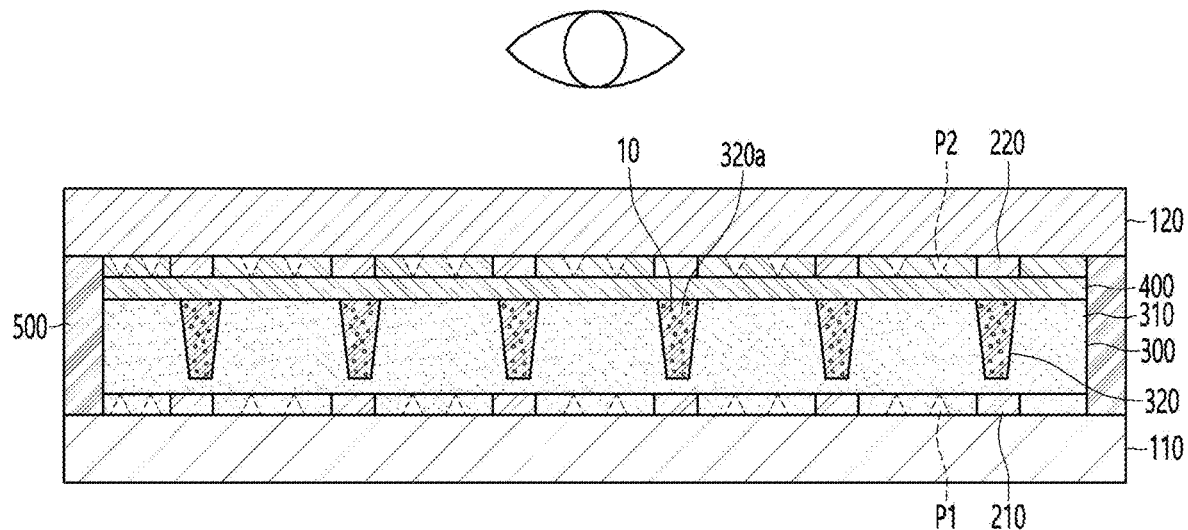
FIGS. 21 to 28 are views showing various cross-sectional views of the light route control member according to another embodiment
Figure 22:
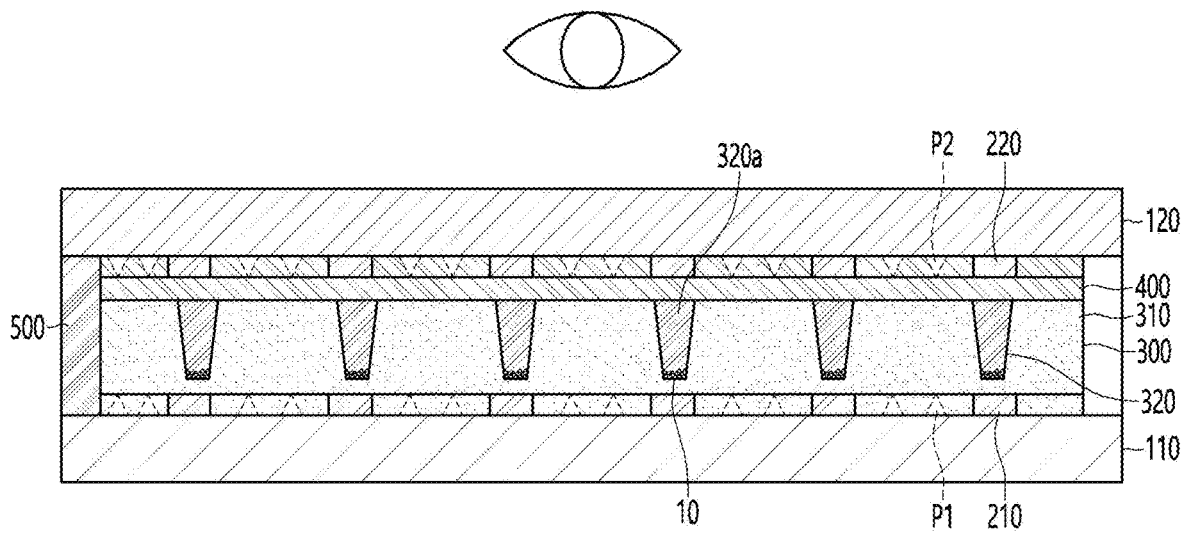

Referring to FIGS. 21 and 22, the first protrusion pattern P1 and the second protrusion pattern P2 may be disposed to face each other. That is, the first protrusion pattern P1 is disposed between the light conversion unit 300 and the first substrate 110, and the second protrusion pattern P2 is disposed between the light conversion unit 300 and the second substrate 110.

The first electrode 210 and the first protrusion pattern P1 may be disposed on the first substrate 110. The first electrode 210 may be disposed between the first protruding patterns P1, and the first protruding pattern P1 may be disposed between the first electrodes 210.

The first protrusion pattern P1 may be disposed in a region overlapping the partition wall unit 310. In addition, the first electrode 210 may be disposed in a region overlapping the receiving unit 320.

The first electrode 210 may be disposed on a region overlapping the receiving unit 320 to apply a voltage to the receiving unit 320.

The first protrusion pattern P1 may collect light moving in the direction of the partition wall unit 310. In detail, the light may be emitted from the lower direction of the first substrate 110 and may be incident in the direction of the light conversion unit 300. The first protrusion pattern P1 may focus the light moving to the light conversion unit to increase the straightness of the light. That is, the first protrusion pattern may play the same role as the first prism substrate of the backlight module.

The second electrode 220 and the second protrusion pattern P2 may be disposed on the second substrate 120. The second electrode 220 may be disposed between the second protruding patterns P1, and the second protruding pattern P2 may be disposed between the second electrodes 220.

The second protrusion pattern P2 may be disposed in an area overlapping the partition wall part 310. In addition, the second electrode 220 may be disposed in a region overlapping the receiving unit 320.

The second electrode 220 may be disposed on a region overlapping the receiving unit to apply a voltage to the receiving unit.

The second protrusion pattern P2 may collect light moving in the direction of the partition wall part 310. In detail, the light may be emitted from the lower direction of the second substrate 120 and may be incident in the direction of the light conversion unit 300. The second protrusion pattern P2 may focus the light moving to the light conversion unit to increase the straightness of the light. That is, the second protrusion pattern may serve as a second prism substrate of the backlight module.

That is, the first and second protrusion patterns may serve as a prism substrate of the backlight module. Accordingly, when the light path control member is combined with another member and applied to a display device, the prism substrate of the backlight module for supplying the light source may be omitted.

Accordingly, when the light route control member is applied to the display device, some components included in the display device may be omitted, thereby reducing the thickness of the display device and increasing the light transmittance according to the decrease in the thickness.

In addition, adhesion between the light conversion unit on the first substrate 110 and the adhesive layer on the light conversion unit may be improved by the first and second protrusion patterns. That is, the surface roughness of the first and second substrates may be increased by the first and second protrusion patterns. Accordingly, a contact area in contact with the light conversion unit and the adhesive layer is increased, so that the first and second substrates and adhesion between the light conversion unit and the adhesive layer may be improved.

Figure 23:
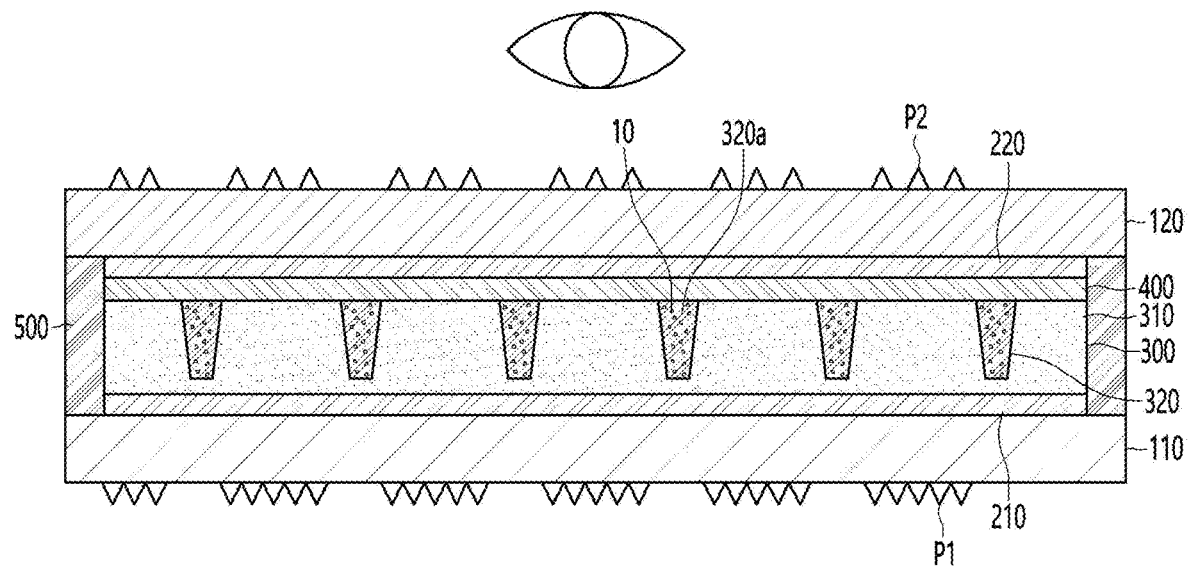
Figure 24:
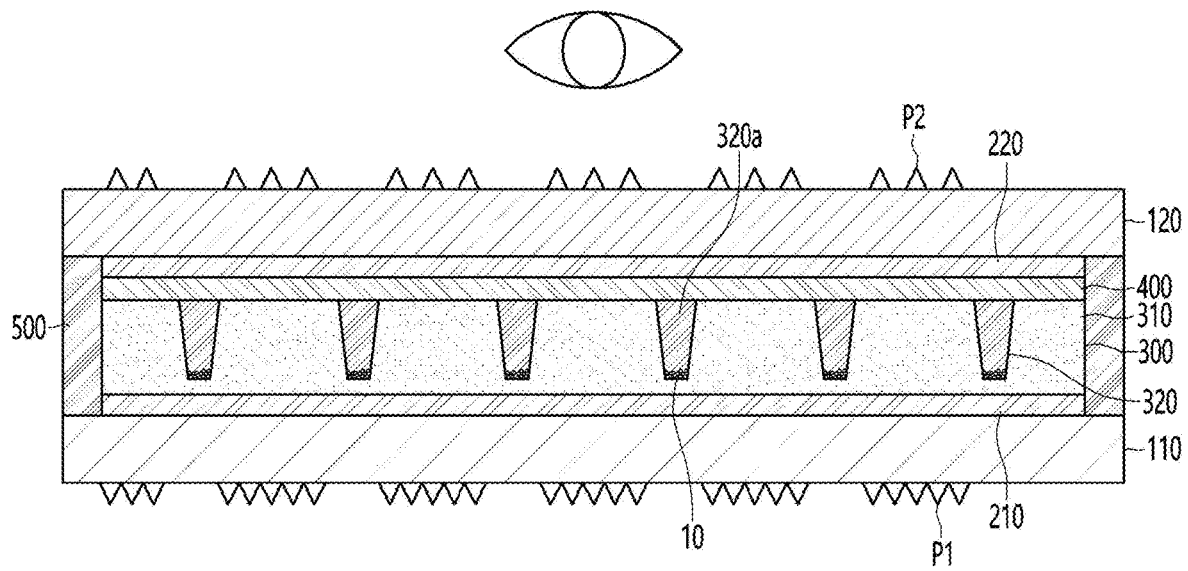

In addition, referring to FIGS. 23 and 24, the first protrusion pattern P1 may be disposed on one surface of the first substrate 110, and the second protrusion pattern P2 may be disposed on one surface of the second substrate 120.

The first protrusion pattern P1 may be disposed on a surface different from that of the first electrode 210. In detail, the first electrode 210 may be disposed on the upper surface of the first substrate 110, and the first protruding pattern P1 may be disposed on the lower surface of the first substrate 110.

Also, the second protrusion pattern P2 may be disposed on a surface different from that of the second electrode 220. In detail, the second electrode 220 may be disposed on the lower surface of the second substrate 120, and the second protruding pattern P2 may be disposed on the upper surface of the second substrate 120.

The first electrode 210 and the second electrode 220 may be disposed as a surface electrode on one surface of the first substrate and the second substrate, respectively. That is, the first electrode 210 and the second electrode 220 may be disposed in a region overlapping the partition wall unit 310 and the receiving unit 320 of the light conversion unit. By disposing the electrode and the protrusion pattern on different surfaces of the substrate, a process of separately patterning the first and second electrodes may be omitted.

Figure 25:
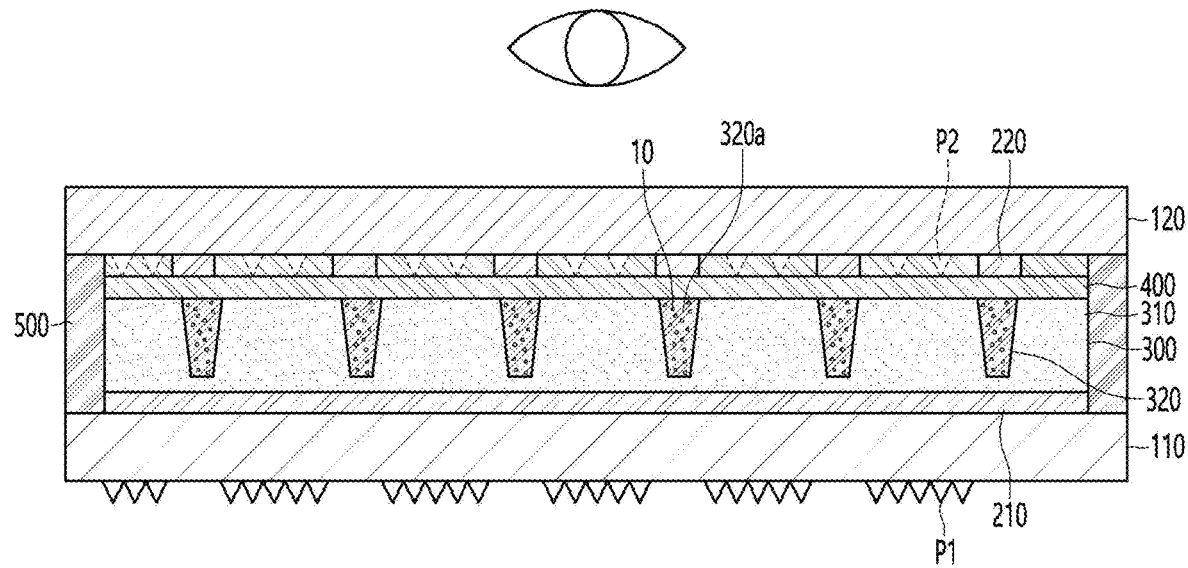
Figure 26:
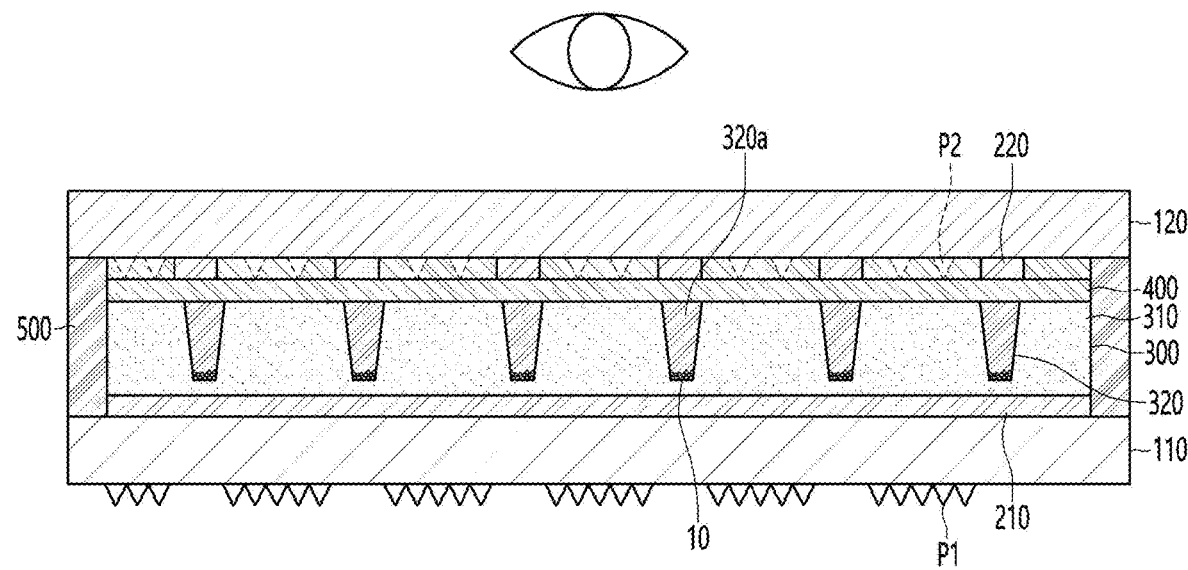

In addition, referring to FIGS. 25 and 26, the first protrusion pattern P1 may be disposed on one surface of the first substrate 110, and the second protrusion pattern P2 may be formed on one surface of the second substrate 120.

The first protrusion pattern P1 may be disposed on a surface different from that of the first electrode 210. In detail, the first electrode 210 may be disposed on the upper surface of the first substrate 110, and the first protruding pattern P1 may be disposed on the lower surface of the first substrate 110.

Also, the second protrusion pattern P2 may be disposed on the same surface as the second electrode 220. In detail, the second electrode 220 and the second protrusion pattern P2 may be disposed on the lower surface of the second substrate 120.

That is, the first electrode 210 may be disposed to face the second electrode 220 and the second protrusion pattern P2.

The first electrode 210 may be disposed as a surface electrode on one surface of the first substrate. Also, the second electrode 220 may be disposed as a plurality of pattern electrodes on one surface of the second substrate. That is, the first electrode 210 may be disposed on a region overlapping the partition wall unit 310 and the receiving unit 320 of the light conversion unit, and the second electrode 220 may be only disposed on a region overlapping the receiving unit 320 of the light conversion unit.

Figure 27:
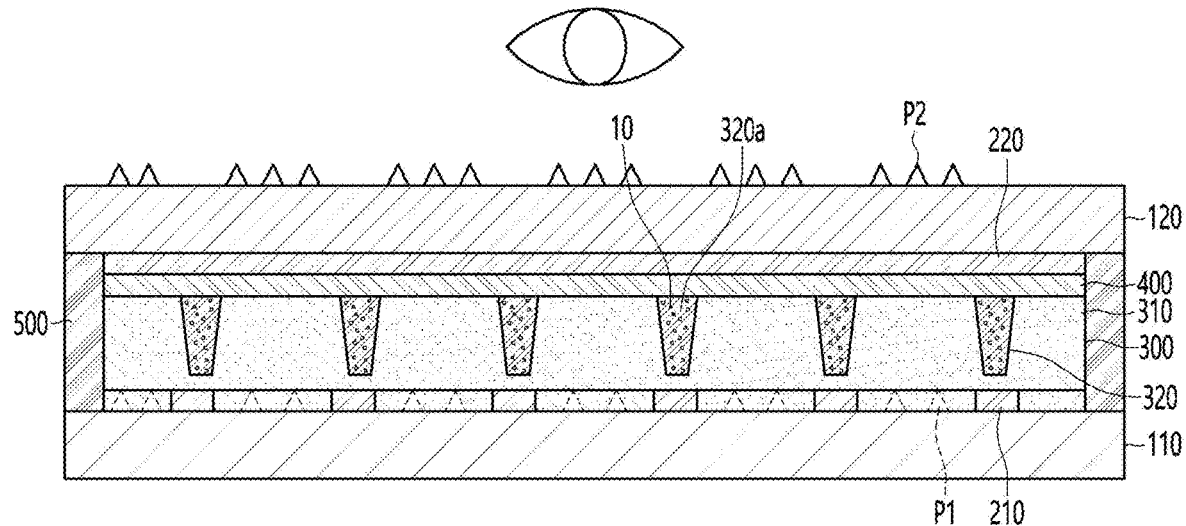
Figure 28:
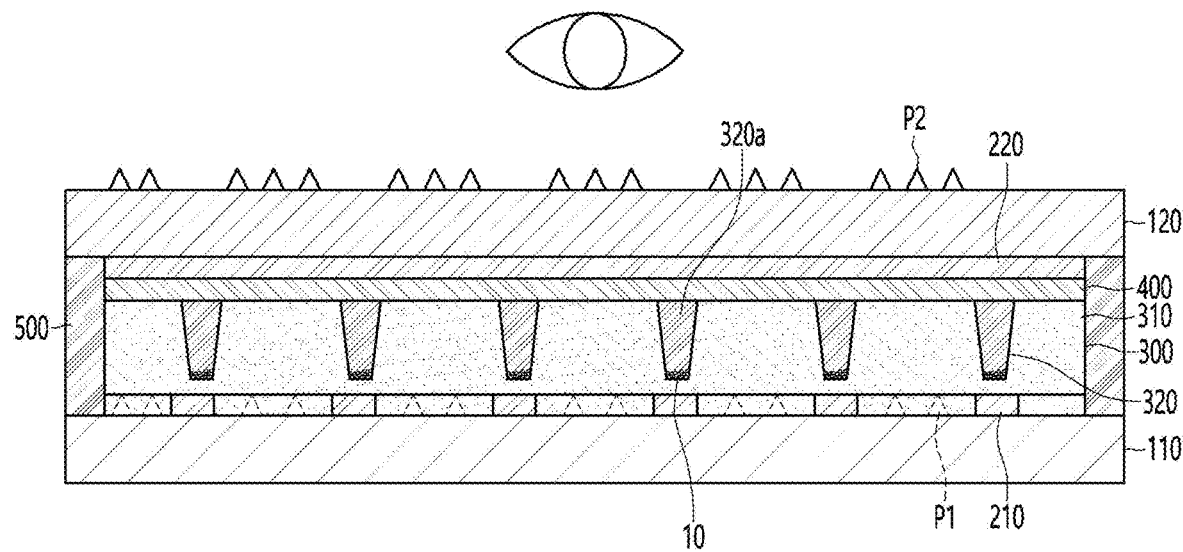

In addition, referring to FIGS. 27 and 28, the first protruding pattern P1 may be disposed on one surface of the first substrate 110, and the second protruding pattern P2 may be disposed on one surface of the second substrate 120.

The first protrusion pattern P1 may be disposed on the same surface as the first electrode 210. In detail, the first electrode 210 and the first protrusion pattern P1 may be disposed on the upper surface of the first substrate 110.

Also, the second protrusion pattern P2 may be disposed on a surface different from that of the second electrode 220. In detail, the second electrode 220 may be disposed on the lower surface of the second substrate 120, and the second protruding pattern P2 may be disposed on the upper surface of the second substrate 120.

That is, the second electrode 220 may be disposed to face the first electrode 210 and the first protrusion pattern P1.

The second electrode 220 may be disposed as a surface electrode on one surface of the second substrate. Also, the first electrode 210 may be disposed as a plurality of pattern electrodes on one surface of the first substrate. That is, the second electrode 220 may be disposed on a region overlapping the partition wall unit 310 and the receiving unit 320 of the light conversion unit, and the first electrode 210 may be only disposed the receiving unit 320 of the light conversion unit.

The light route control member according to another embodiment may include a plurality of protrusion patterns protruding from one surface of the first and second substrates on which the electrodes are disposed.

In detail, the first protrusion pattern may be disposed on the first substrate, and the second protrusion pattern may be disposed on the second substrate. The first and second protrusion patterns may extend in different directions and may serve to collect light moving from the first substrate to the second substrate.

That is, the plurality of protrusion patterns formed on the first and second substrates may have the same function as the prism sheet of the backlight module.

Accordingly, when the light route control member is used in combination with the backlight module, the prism substrate for condensing light in the backlight module may be omitted. Accordingly, it is possible to reduce the thickness of the display device and to reduce light loss occurring while passing through the prism substrate.

In addition, by increasing the surface roughness of the first and second substrates by the first and second protruding members, a contact area between the light conversion unit and the adhesive layer in close contact with the first and second substrates may be increased. Accordingly, it is possible to have an improved adhesion.

Accordingly, the light route control member and the display device including the same according to the embodiment may be formed to have a thin thickness, and may have improved front luminance and reliability.

Hereinafter, referring to FIGS. 29 to 31, a display device and a display apparatus to which a light route control member according to an embodiment is applied will be described.

Figure 29:
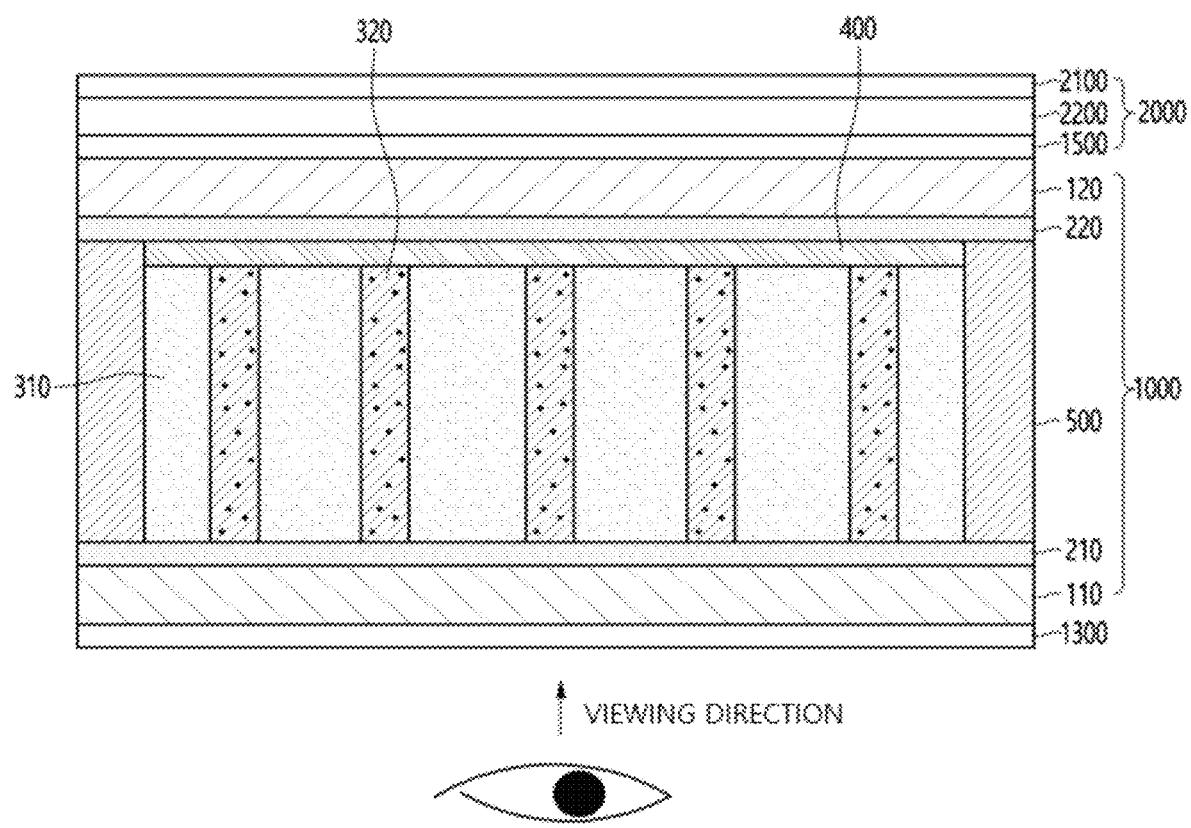
FIG. 29 is a cross-sectional view of a display device to which a light route control member according to an embodiment is applied.

Referring to FIG. 29, a light route control member 1000 according to an embodiment may be disposed on a display panel 2000.

The display panel 2000 and the light route control member 1000 may be disposed to be adhered to each other. For example, the display panel 2000 and the light route control member 1000 may be adhered to each other via an adhesive layer 1500. The adhesive layer 1500 may be transparent. For example, the adhesive layer 1500 may include an adhesive or an adhesive layer containing an optical transparent adhesive material.

The adhesive layer 1500 may include a release film. In detail, when adhering the light route control member and the display panel, the light route control member and the display panel may be adhered after the release film is removed.

The display panel 2000 may include a first substrate 2100 and a second substrate 2200. When the display panel 2000 is a liquid crystal display panel, the light route control member may be formed under the liquid crystal panel. That is, when the user-viewed side of the liquid crystal panel is defined as the upper portion of the liquid crystal panel, the light route control member may be disposed below the liquid crystal panel. The display panel 2000 may be formed in a structure in which the first substrate 2100 including a thin film transistor (TFT) and a pixel electrode and the second substrate 2200 including color filter layers are bonded with a liquid crystal layer interposed therebetween.

In addition, the display panel 2000 may be a liquid crystal display panel of a color filter on transistor (COT) structure in which a thin film transistor, a color filter, and a black matrix are formed at the first substrate 2100 and the second substrate 2200 is bonded to the first substrate 2100 with the liquid crystal layer interposed therebetween. That is, a thin film transistor may be formed on the first substrate 2100, a protective film may be formed on the thin film transistor, and a color filter layer may be formed on the protective film. In addition, a pixel electrode in contact with the thin film transistor may be formed on the first substrate 2100. At this point, in order to improve an aperture ratio and simplify a masking process, the black matrix may be omitted, and a common electrode may be formed to function as the black matrix.

In addition, when the display panel 2000 is the liquid crystal display panel, the display device may further include a backlight unit providing light from a rear surface of the display panel 2000. The backlight unit may be disposed under the light route control member.

That is, as shown in FIG. 29, the light route control member may be disposed under the liquid crystal panel.

Alternatively, when the display panel 2000 is an organic light emitting display panel, the light route control member may be formed on the organic light emitting display panel. That is, when the surface viewed by the user of the organic light emitting display panel is defined as the upper portion of the organic light emitting display panel, the light route control member may be disposed on the organic light emitting display panel. The display panel 2000 may include a self-luminous element that does not require a separate light source. In the display panel 2000, a thin film transistor may be formed on the first substrate 2100, and an organic light emitting element in contact with the thin film transistor may be formed. The organic light emitting element may include an anode, a cathode, and an organic light emitting layer formed between the anode and the cathode. Further, the second substrate 2200 configured to function as an encapsulation substrate for encapsulation may further be included on the organic light emitting element.

Furthermore, although not shown in drawings, a polarizing plate may be further disposed between the light route control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting display panel, the polarizing plate may be the external light reflection preventive polarizing plate.

In addition, an additional functional layer 1300 such as an anti-reflection layer, an anti-glare, or the like may be further disposed on the light route control member 1000. Specifically, the functional layer 1300 may be adhered to one surface of the substrate of the light route control member. Although not shown in drawings, the functional layer 1300 may be adhered to the base 100 of the light route control member via an adhesive layer. In addition, a release film for protecting the functional layer may be further disposed on the functional layer 1300.

Further, a touch panel may be further disposed between the display panel and the light route control member.

Although it is shown in the drawings that the light route control member is disposed at an upper portion of the display panel, but the embodiment is not limited thereto, and the light route control member may be disposed at various positions such as a position in which light is adjustable, that is, a lower portion of the display panel, between a second substrate and a first substrate of the display panel, or the like.

Figure 30:
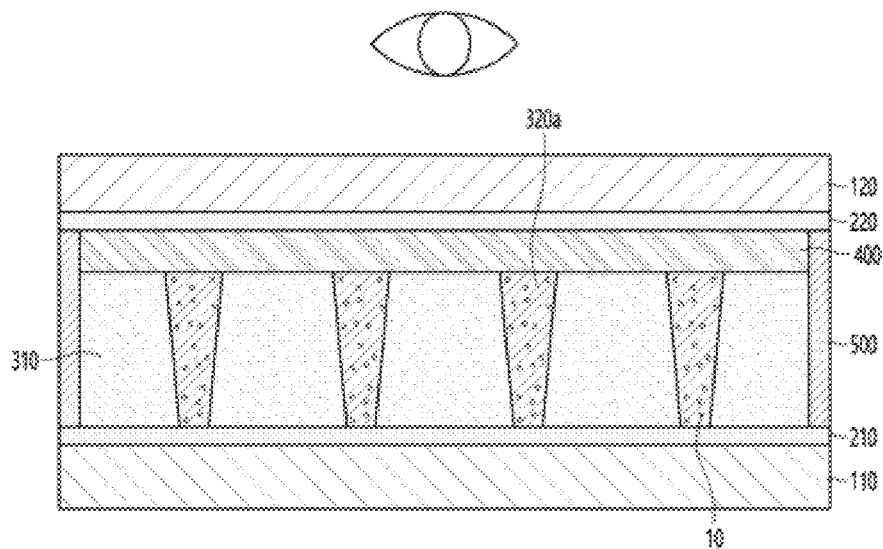
FIGS. 30 and 31 are views for describing one embodiment of the display device to which the light route control member according to the embodiment is applied.
Figure 30:
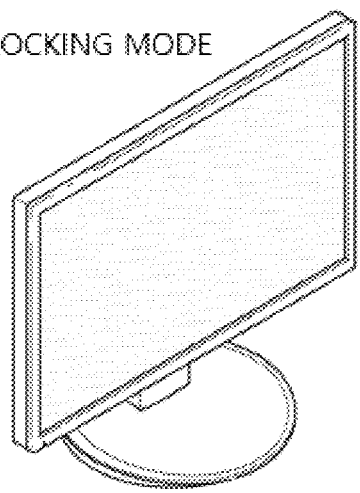
Figure 31:
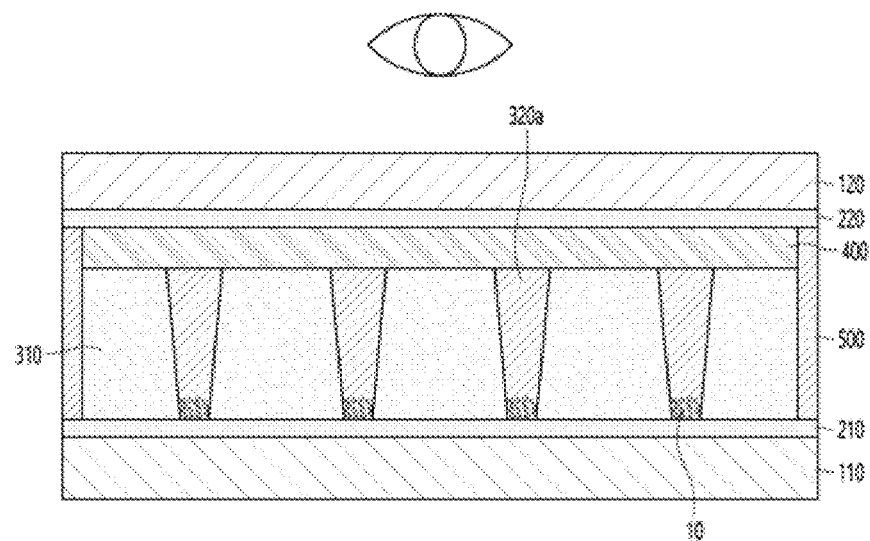
Figure 31:
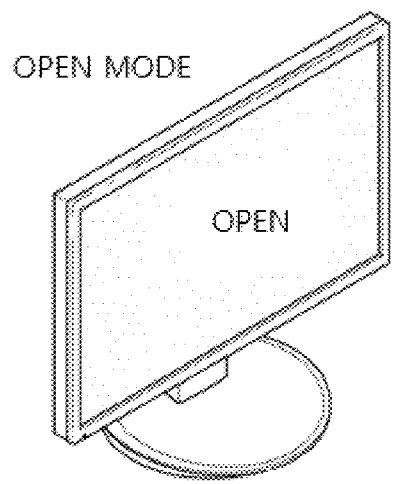

Referring to FIGS. 29 and 30, the light route control member according to the embodiment may be applied to a vehicle.

Referring to FIGS. 29 and 30, the light route control member according to the embodiment may be applied to a display device that displays a display.

For example, when power is not applied to the light route control member as shown in FIG. 29, the receiving unit functions as the light blocking part, so that the display device is driven in a light blocking mode, and when power is applied to the light route control member as shown in FIG. 30, the receiving unit functions as the light transmitting part, so that the display device may be driven in an open mode.

Accordingly, a user may easily drive the display device in a privacy mode or a normal mode according to application of power.

In addition, although not shown in the drawings, the display device to which the light route control member according to the embodiment is applied may also be applied inside the vehicle.

For example, the display device including the light route control member according to the embodiment may display a video confirming information of the vehicle and a movement route of the vehicle. The display device may be disposed between a driver seat and a passenger seat of the vehicle.

In addition, the light route control member according to the embodiment may be applied to a dashboard that displays a speed, an engine, an alarm signal, and the like of the vehicle.

Furthermore, the light route control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An electrophoretic particle comprising carbon black,
   wherein the electrophoretic particle includes a core portion; and a shell portion disposed to surround the outer surface of the core portion,
   wherein a protrusion is formed on the surface of the core part,
   wherein the core part has a chromaticity index of 2 or less,
   wherein the core part has a light absorptivity of 90% to 99%,
   wherein the electrophoretic particle has a particle diameter of 50 nm to 800 nm.

2. The electrophoretic particle of claim 1, wherein a groove portion is further formed on the surface of the core portion, wherein a specific surface area of the core part of 200 m²/g to 650 m²/g.

3. The electrophoretic particle of claim 1, wherein the core part is formed by aggregation of a plurality of nano carbon black particles.

4. The electrophoretic particle of claim 1, wherein a surface treatment layer substituted with a hydroxyl group or a carboxyl group is formed on the surface of the core part,
wherein the shell part is coated on the surface treatment layer.

5. A light route control member comprising:
a first substrate;
a first electrode disposed on an upper surface of the first substrate;
a second substrate disposed on the first substrate;
a second electrode disposed on a lower surface of the second substrate; and
a light conversion unit disposed between the first electrode and the second electrode,
wherein the light conversion unit includes a partition wall unit and a receiving unit that are alternately disposed,
wherein the receiving unit includes a dispersion and a plurality of electrophoretic particles dispersed in the dispersion,
wherein the electrophoretic particles include a core portion; and a shell portion disposed to surround the outer surface of the core portion,
wherein a protrusion is formed on the surface of the core part,
wherein the core part has a chromaticity index of 2 or less,
wherein the core part has a light absorptivity of 90% to 99%,
wherein the electrophoretic particle has a particle diameter of 50 nm to 800 nm.

6. The light route control member of claim 5, wherein a groove portion is further formed on the surface of the core portion,
wherein a specific surface area of the core part of 200 m²/g to 650 m²/g.

7. The light route control member of claim 5, wherein the core part is formed by aggregation of a plurality of nano carbon black particles.

8. The light route control member of claim 5, wherein the receiving unit is driven by the light blocking unit when the voltage is applied, and is driven by the light transmitting unit when the voltage is not applied.

9. A display device comprising:
a display panel; and
a light route control member disposed on or under the display panel,
wherein the light route control member includes:
a first substrate;
a first electrode disposed on an upper surface of the first substrate;
a second substrate disposed on the first substrate;
a second electrode disposed on a lower surface of the second substrate; and
a light conversion unit disposed between the first electrode and the second electrode,
wherein the light conversion unit includes a partition wall unit and a receiving unit that are alternately disposed,
wherein the receiving unit includes a dispersion and a plurality of electrophoretic particles dispersed in the dispersion,
wherein the electrophoretic particles include a core portion; and a shell portion disposed to surround the outer surface of the core portion,
wherein a protrusion is formed on the surface of the core part,
wherein the core part has a chromaticity index of 2 or less,
wherein the core part has a light absorptivity of 90% to 99%,
wherein the electrophoretic particle has a particle diameter of 50 nm to 800 nm.

10. The display device of claim 9, wherein the display panel includes a liquid crystal display panel or an organic light emitting display panel.

11. The electrophoretic particle of claim 1, wherein the electrophoretic particle has a particle diameter of 200 nm to 300 nm.

12. The light route control member of claim 5, wherein a first protrusion pattern is formed on one surface of the first substrate, wherein a second protrusion pattern is formed on one surface of the second substrate.

13. The light route control member of claim 12, wherein the first substrate includes a first area in which the first protrusion pattern is disposed and a second area in which the first protrusion pattern is not disposed,
wherein the second substrate includes a third region in which the second protrusion pattern is disposed and a fourth region in which the second protrusion pattern is not disposed.

14. The light route control member of claim 13, wherein the first protrusion pattern and the second protrusion pattern are disposed to extend in different directions.

15. The light route control member of claim 13, wherein the first electrode and the first protrusion pattern are disposed on the same surface of the first substrate,
and the second electrode and the second protrusion pattern are disposed on the same surface of the first substrate.

16. The light route control member of claim 13, wherein the first electrode and the first protrusion pattern are disposed on the other surface of the first substrate,
wherein the second electrode and the second protrusion pattern are disposed on the other surface of the first substrate.

17. The light route control member of claim 12, wherein the first electrode is disposed between the first protruding patterns,
wherein he second electrode is disposed between the second protruding patterns.

18. The light route control member of claim 12, wherein the first protrusion pattern and the second protrusion pattern overlap the partition wall portion,
wherein the first electrode and the second electrode overlap the receiving unit.

* * * * *